United States Patent
Yamazoe

(10) Patent No.: US 11,556,663 B2
(45) Date of Patent: Jan. 17, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Nobuyuki Yamazoe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 104 days.

(21) Appl. No.: 15/995,138

(22) Filed: Jun. 1, 2018

(65) Prior Publication Data

US 2019/0095637 A1    Mar. 28, 2019

(30) Foreign Application Priority Data

Sep. 25, 2017  (JP) .............................. JP2017-183893

(51) Int. Cl.
| | | |
|---|---|---|
| G06F 16/00 | (2019.01) | |
| G06F 21/62 | (2013.01) | |
| G06F 3/04817 | (2022.01) | |
| G06F 21/31 | (2013.01) | |
| G06F 16/16 | (2019.01) | |

(52) U.S. Cl.
CPC ...... *G06F 21/6218* (2013.01); *G06F 3/04817* (2013.01); *G06F 16/168* (2019.01); *G06F 21/31* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 8,713,106 | B2* | 4/2014 | Spataro ................... | G06F 16/93 |
| | | | | 709/205 |
| 2003/0005135 | A1* | 1/2003 | Inoue ...................... | H04N 7/165 |
| | | | | 709/229 |
| 2015/0193630 | A1* | 7/2015 | Von Kaenel ........... | G06Q 40/08 |
| | | | | 707/785 |
| 2017/0242647 | A1 | 8/2017 | Nakamori et al. | |

FOREIGN PATENT DOCUMENTS

| | | |
|---|---|---|
| JP | 2009251896 | 10/2009 |
| JP | 2011227745 | 11/2011 |
| JP | 2016-115104 | 6/2016 |
| JP | 2017146867 | 8/2017 |

OTHER PUBLICATIONS

Office Action of Japan Counterpart Application, with English translation thereof, dated Jul. 13, 2021, pp. 1-10.
Office Action of Japan Counterpart Application, with English translation thereof, dated Feb. 15, 2022, pp. 1-7.

* cited by examiner

*Primary Examiner* — Tuankhanh D Phan
(74) *Attorney, Agent, or Firm* — JCIPRNET

(57) ABSTRACT

An information processing apparatus includes an access controller that performs control for enabling a content to be accessed on a second terminal in a case where an icon storing the content is presented and the content is opened in a first terminal.

19 Claims, 18 Drawing Sheets

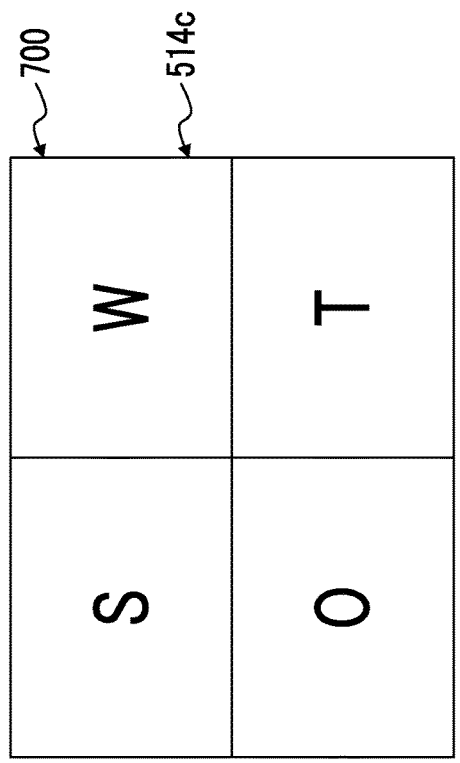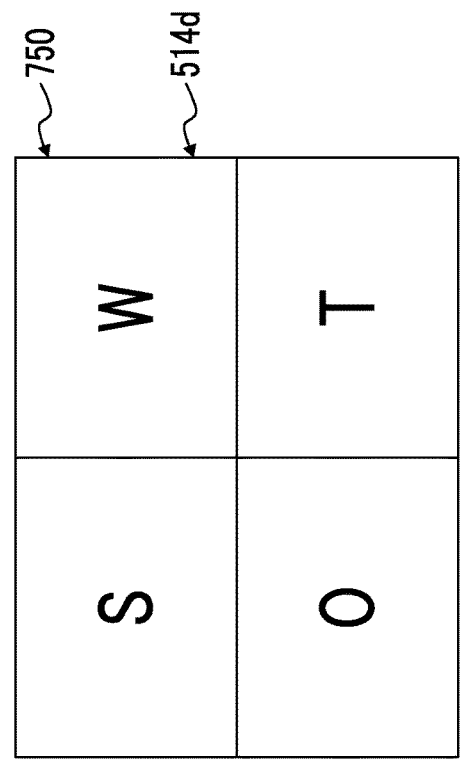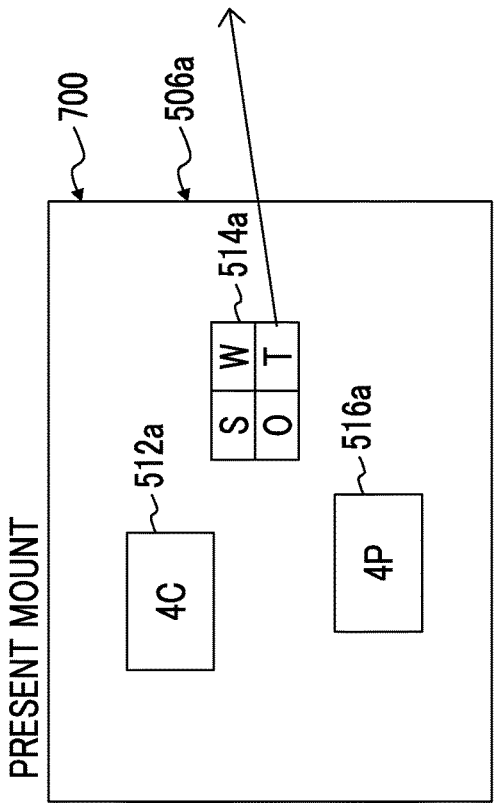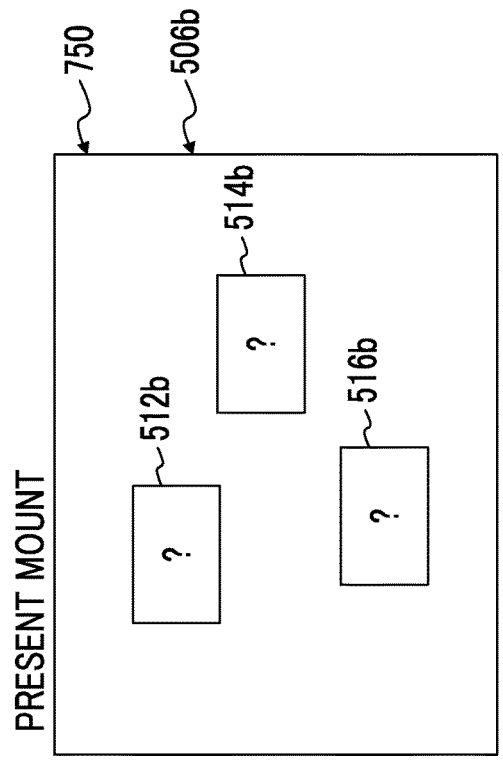

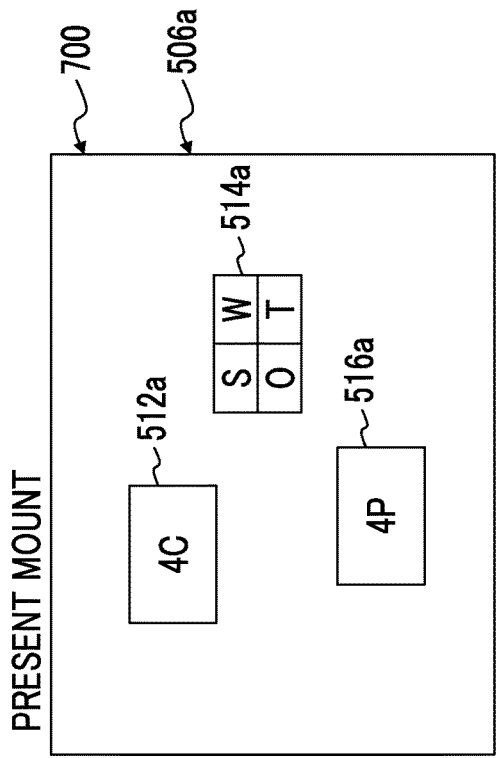
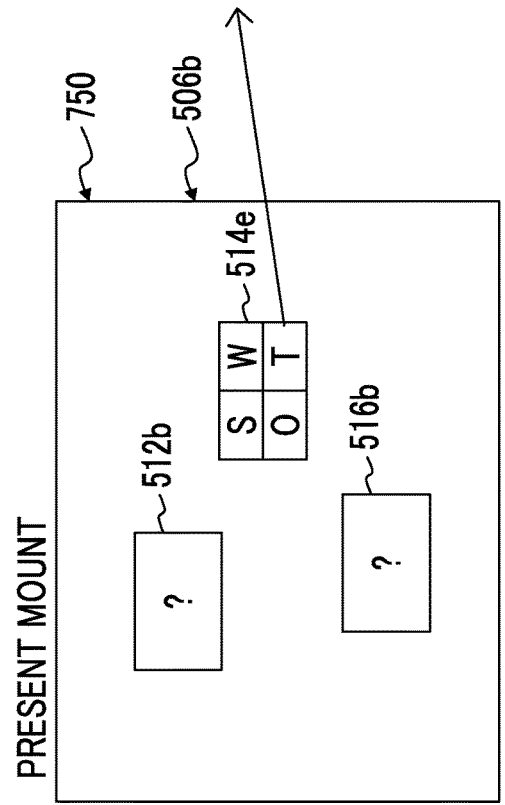
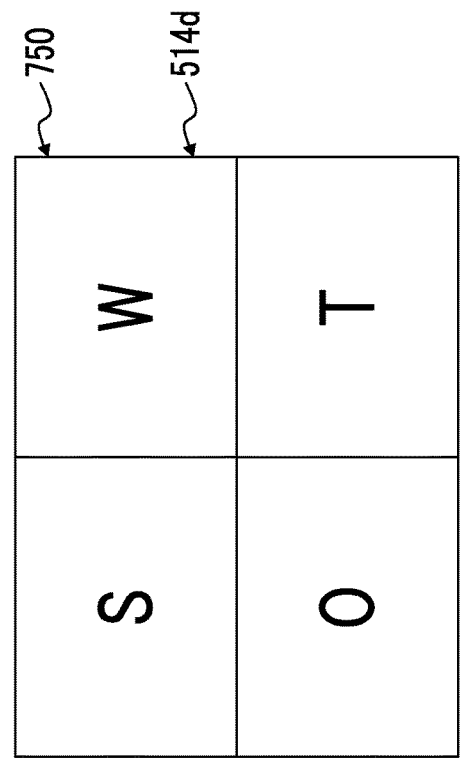

FIG. 9

| 910 | 915 | 920 | 925 | 930 | 935 | 940 | 945 ↙ 900 |
|---|---|---|---|---|---|---|---|
| MOUNT ID | MOUNT NAME | MOUNT PATTERN ID | CREATION DATE AND TIME | CREATOR | PARENT MOUNT | CHILD MOUNT | THUMBNAIL IMAGE |
| | | | | | | | |

FIG. 10

| 1010 | 1012 | 1015 | 1020 | 1025 | 1030 | 1035 | 1040 |
|---|---|---|---|---|---|---|---|
| TAG ID | MOUNT ID | ATTACHMENT POSITION | SIZE | CREATION DATE AND TIME | CREATOR | ATTACHMENT DATE AND TIME | COLOR |
| F0001 | D0001 | (100, 200) | (10, 5) | | KF | | |

| 1045 | 1050 | 1055 | 1060 | 1065 | 1070 |
|---|---|---|---|---|---|
| FRAME LINE SHAPE | FRAME LINE COLOR | FRAME LINE THICKNESS | BELONGING GROUP | CONTENT TYPE | CONTENT |
| | | | | TEXT | |

1000

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-183893 filed Sep. 25, 2017.

BACKGROUND

Technical Field

The present invention relates to an information processing apparatus and a non-transitory computer readable medium storing an information processing program.

SUMMARY

According to an aspect of the invention, there is provided an information processing apparatus including an access controller that performs control for enabling a content to be accessed on a second terminal in a case where an icon storing the content is presented and the content is opened in a first terminal.

BRIEF DESCRIPTION OF THE DRAWINGS

Exemplary embodiment(s) of the present invention will be described in detail based on the following figures, wherein:

FIGS. 7A1 to 7B2 are diagrams illustrating a processing example according to this exemplary embodiment;

FIGS. 8A1 to 8B2 are diagrams illustrating a processing example according to this exemplary embodiment;

FIG. 9 is a diagram illustrating an example of a data structure of a mount information table;

FIG. 10 is a diagram illustrating an example of a data structure of a tag information table;

DETAILED DESCRIPTION

Hereinafter, an example of an exemplary embodiment in realizing the invention will be described with reference to the accompanying drawings.

Figure 1:
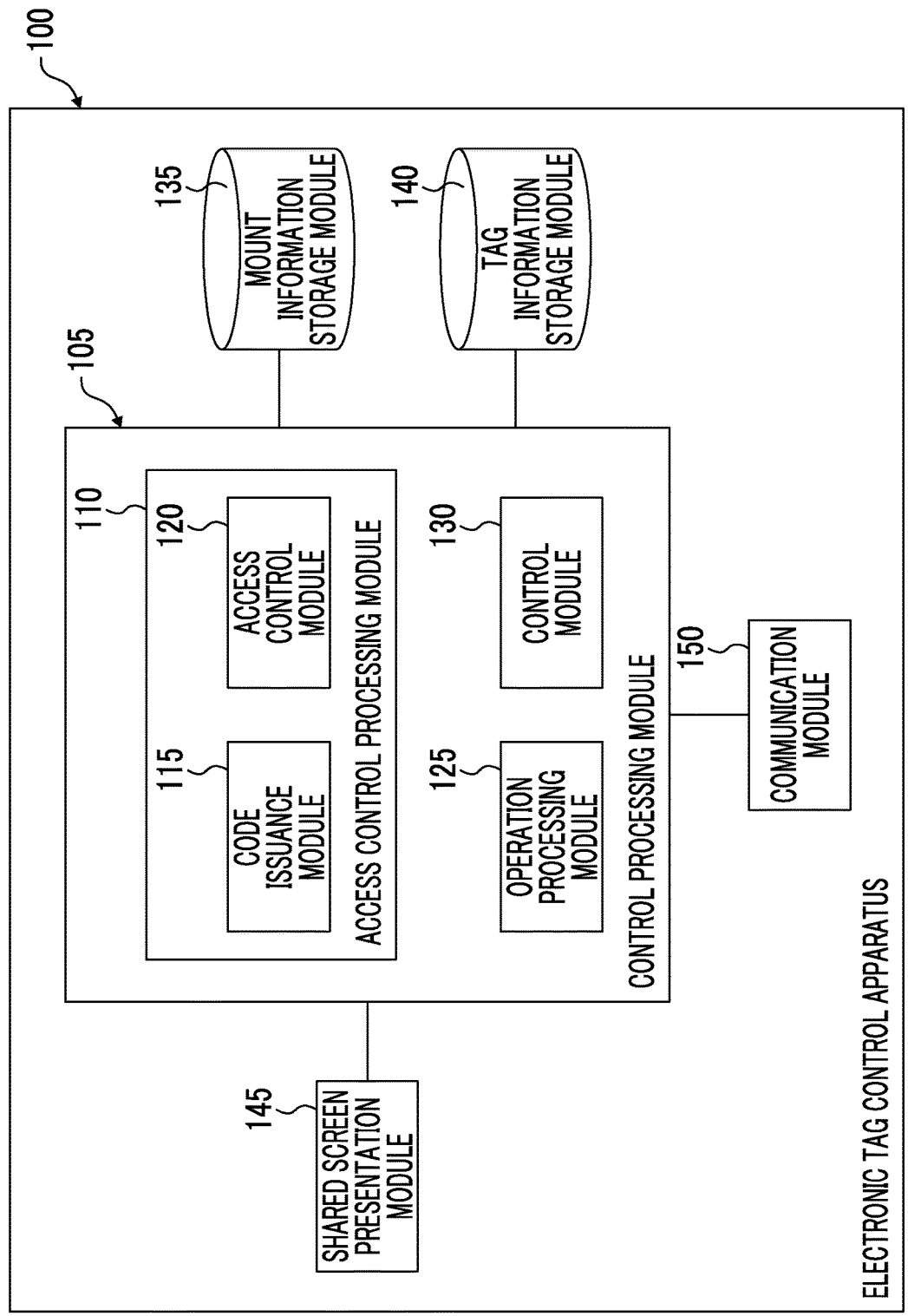
FIG. 1 is a conceptual module configuration diagram illustrating a configuration example of this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication line, and registers, and the like inside a central processing unit (CPU).

An electronic tag control apparatus 100 (an example of an information processing apparatus) which is this exemplary embodiment performs the access control of an icon and a content which are likely to be used by plural persons, and includes a control processing module 105, a mount information storage module 135, a tag information storage module 140, a shared screen presentation module 145, and a communication module 150, as illustrated in the example of FIG. 1. Examples of the icon include a mount, a folder, and a mark indicating an application, and the like. The content has a relationship as a child of the icon. For example, in a case where the icon is a mount, the content corresponds to a child mount which is attachable to the mount. In a case where the icon is a folder, the content corresponds to a child folder capable of being included in the folder, a document file, or the like. In a case where the icon is a mark indicating an application, the content corresponds to an application (software itself) which corresponds to the mark of the application.

The control processing module 105 includes an access control processing module 110, an operation processing module 125, and a control module 130, and is connected to a mount information storage module 135, a tag information storage module 140, a shared screen presentation module 145, and a communication module 150. The control processing module 105 performs the access control of an icon and a content.

The access control processing module 110 includes a code issuance module 115 and an access control module 120. The access control processing module 110 performs the access control of an icon and a content which are capable of being displayed on a shared screen controllable by the electronic tag control apparatus 100. Here, the shared screen is a screen (generally, a large-scale screen) which is viewable by plural users, and corresponds to a display apparatus such as a liquid crystal display. Meanwhile, a first terminal includes the shared screen, and may include the electronic tag control apparatus 100. A second terminal is operated by the user and is connected to the first terminal through a communication line.

The code issuance module 115 issues a code for accessing the icon. The code is a code for temporarily accessing the icon. For example, the code is also called as a PIN-CODE, and access to the icon is allowed on the condition that the PIN-CODE is received. The term "temporarily" as mentioned herein is a period between the opening of the icon and the closing of the icon. In addition, the term "code" as mentioned herein may be a code for accessing a content (for example, a tag attached to a mount), other than the icon (for example, a mount).

The code issuance module 115 presents the code to the user. Specifically, the code issuance module displays the PIN-CODE which is generated by the code issuance module 115, on the shared screen.

The code issuance module 115 controls the second terminal so as to present the icon, on the condition that the code is received from the user.

In addition, the code issuance module 115 may invalidate an access right to the icon and the content with respect to the second terminal in a case where the code is invalidated in the first terminal.

In addition, the code issuance module 115 may invalidate an access right corresponding to the content in a case where the content is closed in the first terminal.

Meanwhile, as the access right, any one or more of thumbnail image display, viewing, contribution, and editing can be set (to be described later with reference to FIG. 20).

The access control module 120 performs control for enabling a content to be accessed on the second terminal in a case where an icon storing the content is presented within a predetermined time slot and the content is opened in the first terminal.

In addition, the access control module 120 may perform control so as not to allow access to the content on the second terminal, in a case where the icon is presented but the content is not opened in the first terminal.

In addition, the access control module 120 may set an access right to the content in accordance with an operation of a user of the first terminal. The setting in this case is invalidated before the content is opened. That is, the setting of the access right to the content is validated with the opening of the content as a trigger. Accordingly, even in a case where an access right for viewing or the like is set until the content is opened in the first terminal, access to the content cannot be performed in the second terminal. Specifically, in a case where a facilitator does not open the content, a participant performs control so that the content is not accessed.

In addition, the setting of an access right by the access control module 120 can be performed even before the icon is presented.

In addition, the access control module 120 may perform control so that a parent icon is not accessed from the second terminal, even in a case where a code is valid with respect to the parent icon in a case where a content (a content associated with an icon) which is included in an icon different from an icon for which a code is issued is opened in the first terminal.

In addition, the access control module 120 may perform control so that the parent icon is not accessed from the second terminal in a case where the parent icon which is an icon serving as a parent of the icon is opened in the first terminal and a code is valid with respect to the parent icon.

In addition, the access control module 120 may perform control so that "another content" is accessed from the second terminal in a case where another content, which is not included in the icon, is copied to the icon in the first terminal and a code is valid with respect to "another child icon". Meanwhile, the code is issued in units of assemblies (so-called conference sessions).

The operation processing module 125 receives an operation with respect to an icon and a content which are displayed on the shared screen and performs processing on the icon and the content in accordance with the operation. In addition, the access control module 120 is inquired whether or not the access control module has an access right to process the icon and the content which are to be operated, in performing the processing. The icon and the content can be processed in a case where the icon and the content can be accessed, and cannot be processed in a case where the icon and the content cannot be accessed.

The control module 130 controls the entire electronic tag control apparatus 100 (first terminal) or the second terminal.

For example, the control module 130 performs control so as to present a reduced image of the content on the second terminal even in a case where access to the content is not allowed on the second terminal.

The mount information storage module 135 is connected to the control processing module 105. The mount information storage module 135 stores information on the icon.

The tag information storage module 140 is connected to the control processing module 105. The tag information storage module 140 stores information on the content.

The shared screen presentation module 145 is connected to the control processing module 105. The shared screen presentation module 145 performs a presentation process on the shared screen in accordance with the control of the control processing module 105.

The communication module 150 is connected to the control processing module 105. The communication module 150 performs communication with the second terminal through a communication line. For example, the communication module receives an operation on the icon and the content from the second terminal, or transmits information on the control of presentation on a display apparatus of the second terminal.

Hereinafter, a description will be given of an example of a case where a mount is used as an icon and a child mount is used as a content.

The electronic tag control apparatus 100 performs processing related to a mount and a tag (also referred to as an electronic tag, an electronic card, or the like) which are used at an assembly.

The term "assembly" as mentioned herein may be a meeting in which plural persons gather and talk with each other, and examples of the assembly include a conference, a workshop, an idea extraction meeting, an examination meeting, a consultation, a discussion, a gathering, a meeting, and the like. This exemplary embodiment relates to an electronic tag system (also referred to as an electronic white board and the like) which uses an electronic tag and a mount.

Specifically, the electronic tag control apparatus 100 is used at an assembly performed by a facilitator (generally, one facilitator) and plural participants by using a tag. The participant creates a tag having an idea and the like written thereon by using an electronic tag terminal 250 as a terminal for a participant. In general, as illustrated in examples of FIGS. 3A to 3C, there are plural electronic tag terminals 250 including an electronic tag terminal 250A, an electronic tag terminal 250B, and the like (hereinafter, representatively referred to as an electronic tag terminal 250) which are owned by the respective participants. The electronic tag control apparatus 100 receives a tag from the electronic tag terminal 250 and attaches the tag onto a mount (or a background). The facilitator determines or changes the position of a tag on the mount, arranges tags (also referred to as the association of a first tag with a second tag, the formation of a group, and the like), or performs the creation of tag information, and the like by himself or herself by using the shared screen which is the display apparatus of the electronic tag control apparatus 100, to thereby progress the assembly. Meanwhile, in this exemplary embodiment, the participant includes a facilitator.

The control processing module 105 includes the access control processing module 110, the operation processing module 125, and the control module 130, and is connected to the mount information storage module 135, the tag information storage module 140, the shared screen presentation module 145, and the communication module 150. The control processing module 105 performs the access control of a mount and a child mount. The term "child mount" as mentioned herein refers to "another mount" in a case where another mount is attached onto the mount. The term "child mount" as mentioned herein is treated equally to a tag attached to a mount. Therefore, it is possible to perform operations such as movement within the mount, copying, and the like. However, in a case where the child mount is opened, a mount corresponding to the child mount is opened. It is possible to perform operations equal to a parent mount (a mount to which the child mount is attached) on the mount. In addition, another child mount may be further provided on the mount corresponding to the child mount.

The access control processing module 110 includes the code issuance module 115 and the access control module 120. The access control processing module 110 performs the access control of a mount and a child mount which are capable of being displayed on a shared screen which is controllable by the electronic tag control apparatus 100. The first terminal includes a shared screen (may include the electronic tag control apparatus 100), and is a terminal which is generally used by a facilitator. The second terminal is a terminal which is operated by a user who is a participant in the assembly, and is connected to the first terminal through a communication line.

The code issuance module 115 issues a code for accessing a mount. The code is a code for temporarily accessing the mount. For example, the code is also referred to as a PIN-CODE, and access to the mount is allowed on the condition that the PIN-CODE is received from the user of the second terminal. The term "temporarily" as mentioned herein is a period between the opening of the mount and the closing of the mount.

The code issuance module 115 presents the code to the user. Specifically, the code issuance module displays the PIN-CODE which is generated by the code issuance module 115, on the shared screen, and the participant in the assembly views the PIN-CODE and inputs the PIN-CODE on the second terminal. In a case where the input PIN-CODE and the presented PIN-CODE are the same as each other, the second terminal can access the mount. The code issuance module 115 controls the second terminal used by the user so as to present the mount, on the condition that the code is received from the second terminal used by the user.

In addition, the code issuance module 115 invalidates a code corresponding to the mount in a case where the mount is closed in the first terminal. The wording "invalidation of code" as mentioned herein means that access to a mount corresponding to a PIN-CODE cannot be performed in the second terminal in which the PIN-CODE is input.

Figure 11:
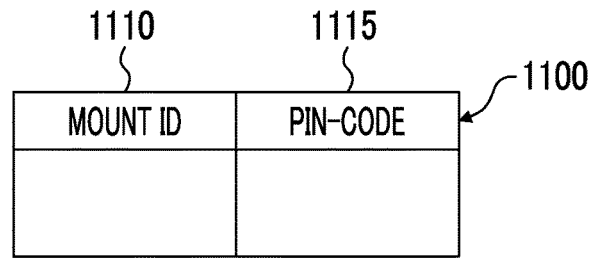
FIG. 11 is a diagram illustrating an example of a data structure of a mount ID and PIN-CODE correspondence table.

Meanwhile, the code issuance module 115 may manage a relationship between a mount and a PIN-CODE, for example, by a mount ID and PIN-CODE correspondence table 1100. FIG. 11 is a diagram illustrating an example of a data structure of the mount ID and PIN-CODE correspondence table 1100.

The mount ID and PIN-CODE correspondence table 1100 includes a mount ID column 1110 and a PIN-CODE column 1115. The mount ID column 1110 stores a mount ID of a mount. The PIN-CODE column 1115 stores a PIN-CODE corresponding to the mount.

Figure 12:
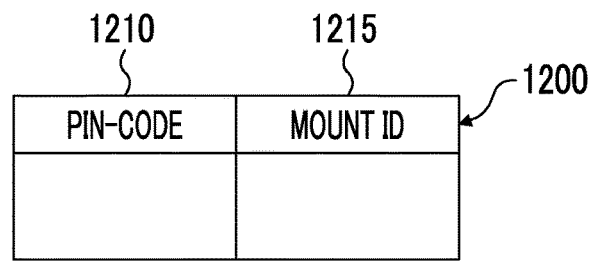
FIG. 12 is a diagram illustrating an example of a data structure of a PIN-CODE and terminal ID correspondence table.

In addition, the code issuance module 115 may manage a relationship between a PIN-CODE and the electronic tag terminal 250 having transmitted the PIN-CODE, for example, by a PIN-CODE and terminal ID correspondence table 1200. FIG. 12 is a diagram illustrating an example of a data structure of the PIN-CODE and terminal ID correspondence table 1200. The PIN-CODE and terminal ID correspondence table 1200 includes a PIN-CODE column 1210 and a terminal ID column 1215. The PIN-CODE column 1210 stores a PIN-CODE. The terminal ID column 1215 stores information (terminal ID) for uniquely identifying a terminal in this exemplary embodiment. The terminal ID is a terminal ID of the electronic tag terminal 250 having transmitted the PIN-CODE.

Figure 13:
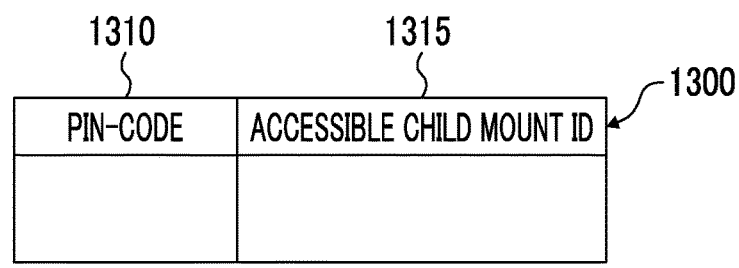
FIG. 13 is a diagram illustrating an example of a data structure of a PIN-CODE and accessible child mount ID correspondence table.

In addition, the code issuance module 115 may manage a relationship between a PIN-CODE and a child mount ID of a child mount capable of being accessed through the PIN-CODE, for example, by a PIN-CODE and accessible child mount ID correspondence table 1300. That is, the code issuance module manages a relationship with a child mount ID of a child mount included in a mount of a mount ID stored in the mount ID column 1110 of the mount ID and PIN-CODE correspondence table 1100. FIG. 13 is a diagram illustrating an example of a data structure of the PIN-CODE and accessible child mount ID correspondence table 1300. The PIN-CODE and accessible child mount ID correspondence table 1300 includes a PIN-CODE column 1310 and an accessible child mount ID column 1315. The PIN-CODE column 1310 stores a PIN-CODE. The accessible child mount ID column 1315 stores a child mount ID of a child mount which can be accessed through the PIN-CODE.

The access control module 120 performs control for enabling a child mount to be accessed on the second terminal in a case where a mount storing the child mount is presented and the child mount is opened in the first terminal. The wording "mount storing child mount" as mentioned herein mean that the child mount is attached onto the mount.

Meanwhile, the access control module 120 may enable the child mount to be accessed on the second terminal in a case where the child mount is opened within a predetermined time slot after the mount is presented. That is, as a condition that the child mount is enabled to be accessed, the child mount is required to be opened within the predetermined time slot.

In addition, the access control module 120 performs control for enabling the child mount to be accessed within the predetermined time slot on the second terminal in a case where the mount storing the child mount is presented and the child mount is opened in the first terminal. That is, in a case where the condition enabling the access is satisfied, the access can be performed within the predetermined time slot.

In a case where a mount having a tag and a child mount attachable thereto is presented on the first terminal including the shared screen at the assembly and a child mount of the mount is opened, the access control module 120 performs control for enabling the child mount to be accessed on the second terminal of the user participating in the assembly.

A tree structure can be formed between plural mounts, and a target mount may include a child mount and a parent mount. The child mount is attached to the target mount. Following can be performed in a descendant direction by opening the child mount. In addition, the parent mount can follow from the target mount. For example, following may be performed in an ancestor direction by preparing a button for "opening a parent mount" as a user interface.

In addition, the access control module 120 may perform control for enabling a child mount not to be accessed on the second terminal in a case where a mount is presented but the child mount is not opened in the first terminal.

In addition, the access control module 120 may set an access right to a child mount in accordance with an operation of the user of the first terminal. The setting in this case is validated after a mount is presented. The setting in this case is invalid before a mount is presented.

In a case where a parent mount of a mount is opened in the first terminal and a code is valid with respect to the parent mount, the access control module 120 may perform control for enabling the parent mount to be accessed from the second terminal.

In a case where another child mount, which is not included in a mount, is copied to the mount in the first terminal and a code is valid with respect to the "another child mount", the access control module 120 may perform control for enabling the "another child mount" to be accessed from the second terminal.

Figure 14:
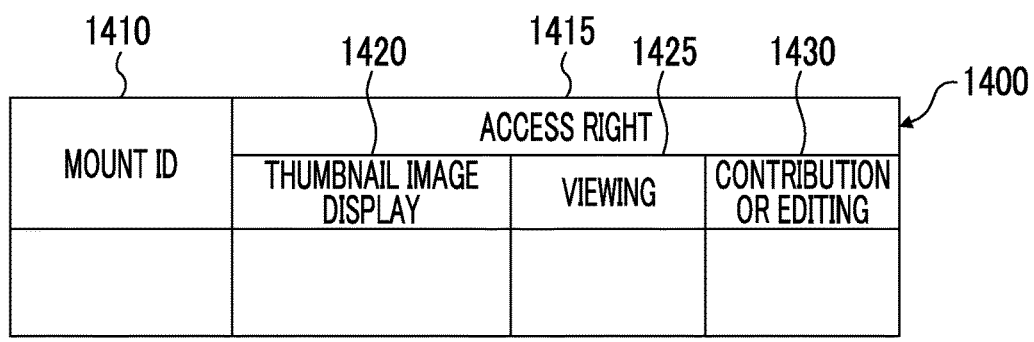
FIG. 14 is a diagram illustrating an example of a data structure of an access right table.

In addition, the access control module 120 may manage a relationship between a mount and contents of an access right, for example, by an access right table 1400. FIG. 14 is a diagram illustrating an example of a data structure of the access right table 1400. The access right table 1400 includes a mount ID column 1410 and an access right column 1415, and the access right column 1415 includes a thumbnail image display column 1420, a viewing column 1425, and a contribution or editing column 1430. The mount ID column 1410 stores a mount ID. The access right column 1415 stores an access right given to a mount of the mount ID. The thumbnail image display column 1420 stores information on whether or not there is an access right to the thumbnail image display of the mount. The viewing column 1425 stores information on whether or not there is an access right to the viewing of the mount. The contribution or editing column 1430 stores information on whether or not there is an access right to the contribution or editing of the mount. That is, in this example, the access right is classified into three rights of a right to thumbnail image display, a right to viewing, and a right to contribution or editing. Naturally, the access right may include other rights. On the contrary, these rights may be reduced.

The operation processing module 125 receives operations with respect to a mount, a child mount, and a tag which are displayed on the shared screen, and performs processing on the mount, the child mount, and the tag in accordance with the operations. In addition, the access control module 120 is inquired whether or not the access control module has an access right to process the mount and the child mount to be operated, in performing the processing (processing corresponding to the operations received from the second terminal). The mount and the child mount can be processed in a case where the mount and the child mount can be accessed, and cannot be processed in a case where the mount and the child mount cannot be accessed. Meanwhile, in a case where access to the mount can be performed, the tag attached onto the mount can also be accessed, and editing can be performed. In a case where access to the mount cannot be performed, the tag attached onto the mount cannot be accessed, and editing cannot be naturally performed.

The control module 130 controls the entire electronic tag control apparatus 100 (first terminal) which is chiefly used by the facilitator, or the second terminal which is used by the user who is the participant.

For example, the control module 130 may perform control so as to present a reduced image of a child mount on the second terminal even in a state where access to the child mount is not allowed on the second terminal.

The mount information storage module 135 is connected to the control processing module 105. The mount information storage module 135 stores information on a mount. For example, the mount information storage module stores a mount information table 900.

FIG. 9 is a diagram illustrating an example of a data structure of the mount information table 900. The mount information table 900 includes a mount ID column 910, a mount name column 915, a mount pattern ID column 920, a creation date and time column 925, a creator column 930, a parent mount ID column 935, a child mount ID column 940, and a thumbnail image column 945. The mount ID column 910 stores information (mount ID) for uniquely identifying a mount in this exemplary embodiment. The mount name column 915 stores the name of the mount of the mount ID. The mount pattern ID column 920 serving as a background stores a mount pattern ID. Examples of the mount pattern include a pattern of blank paper, a pattern in a table format, a pattern having an attachment region of a tag for each tag for introductory remarks, and the like. The creation date and time column 925 stores a creation date and time (may be year, month, day, hour, minute, second, a time unit smaller than second, or a combination thereof) of the mount. The creator column 930 stores the creator of the mount. The parent mount ID column 935 stores a mount ID of a parent mount with respect to the mount. The child mount ID column 940 stores a mount ID of a child mount (which is attached to the mount) which is included in the mount. The thumbnail image column 945 stores a thumbnail image of the mount. For example, in a case where the child mount on the mount is displayed, the child mount is displayed using the thumbnail image. Even in a case where the child mount cannot be accessed in the electronic tag terminal 250, the thumbnail image is displayed on the electronic tag terminal 250.

The tag information storage module 140 is connected to the control processing module 105. The tag information storage module 140 stores information on a child mount. For example, the tag information storage module stores a tag information table 1000.

FIG. 10 is a diagram illustrating an example of a data structure of the tag information table 1000. The tag information table 1000 includes a tag ID column 1010, a mount ID column 1012, an attachment position column 1015, a size column 1020, a creation date and time column 1025, a creator column 1030, an attachment date and time column 1035, a color column 1040, a frame line shape column 1045, a frame line color column 1050, a frame line thickness column 1055, a belonging group column 1060, a content type column 1065, and a content column 1070. The tag ID column 1010 stores information (tag ID) for uniquely identifying a tag in this exemplary embodiment. The mount ID column 1012 stores a mount ID. The attachment position column 1015 stores an attachment position of the tag. That is, the attachment position column stores an attachment position on a mount. For example, the attachment position is coordinates in an XY coordinate system of the mount. The size column 1020 stores the size of the tag. For example, in a case where a tag to be displayed has a rectangular shape, the size column stores a width and a height. The creation date and time column 1025 stores a date and time when the tag is created. The creator column 1030 stores the creator (creator ID) of the tag. Alternatively, the creator column may store an information processing apparatus (a device ID of the electronic tag terminal 250 or the electronic tag control apparatus 100) by which the tag is created. The attachment date and time column 1035 stores a date and time when the tag is attached to a mount. The color column 1040 stores the display color of the tag. The frame line shape column 1045 stores the shape (a solid line, a dotted line, a dashed line, a wavy line, a double line, or the like) of a frame line in the display of the tag. The frame line color column 1050 stores the color of the frame line in the display of the tag. The frame line thickness column 1055 stores the thickness of the frame line in the display of the tag. The belonging group column 1060 stores information on a group to which the tag belongs. For example, information indicating whether or not the tag belongs to a group may be stored, or a group ID in a case where the tag belongs to a group, another tag ID belonging to the group, and the like may be stored. The content type column 1065 stores the type of contents of the tag (text information, vector data indicating handwritten characters, a figure, and the like, sound information, still image information such as a photograph, movie information, or information indicating a combination thereof). The content column 1070 stores contents written in the tag.

Meanwhile, to which mount the tag is attached can be extracted by using the mount ID column 1012 of the tag information table 1000.

In addition, a child mount attached to the mount can be extracted by using the child mount ID column 940 of the mount information table 900.

The shared screen presentation module 145 is connected to the control processing module 105. The shared screen presentation module 145 performs presentation processing to a shared screen under the control of the control processing module 105.

The communication module 150 is connected to the control processing module 105. The communication module 150 performs communication with the second terminal through a communication line. For example, the communication module receives operations with respect to a mount, a child mount, and a tag from the second terminal, or transmits information on the control of presentation to the display apparatus of the second terminal.

Figure 2:
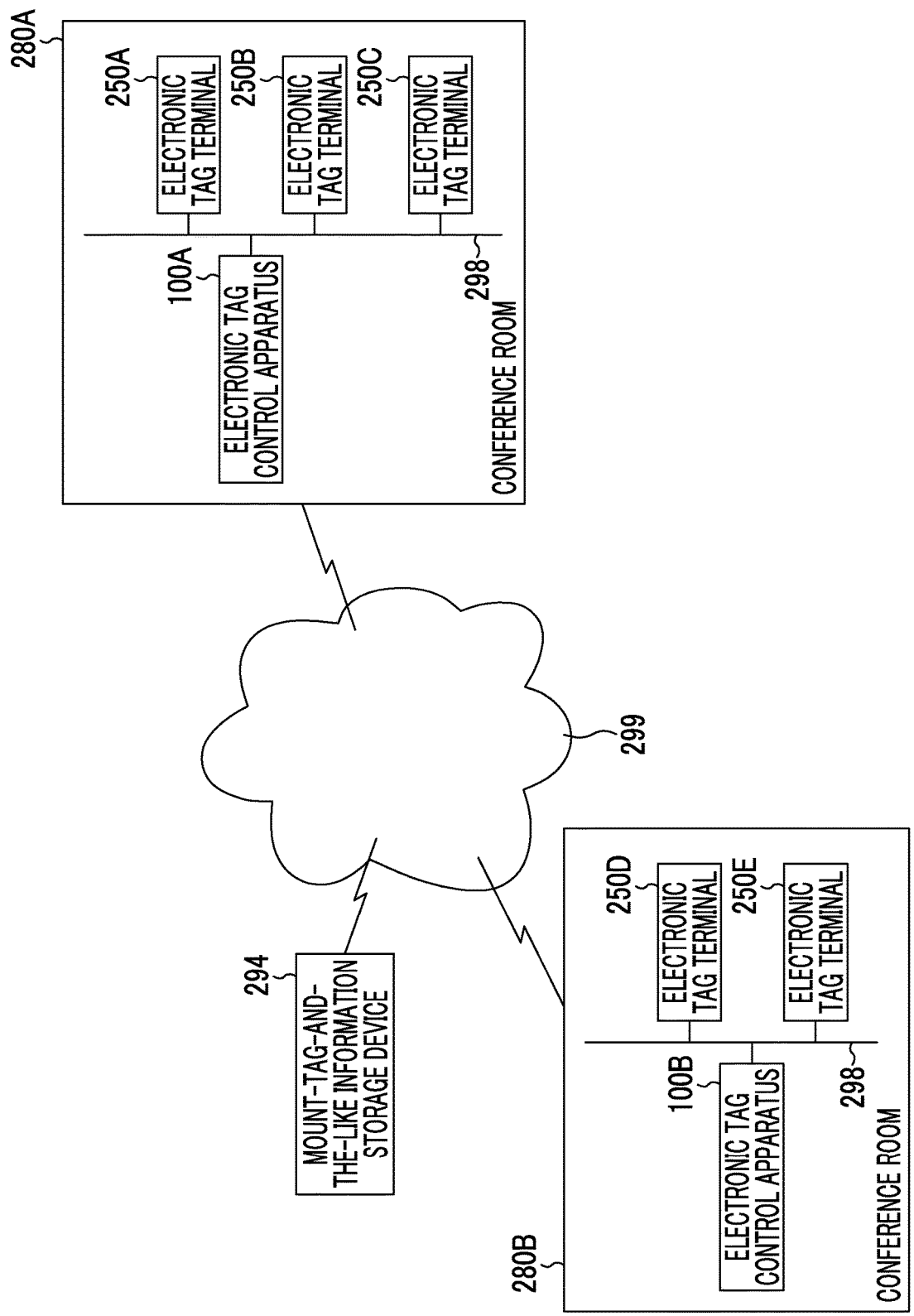
FIG. 2 is a diagram illustrating a system configuration example using this exemplary embodiment.

FIG. 2 is a diagram illustrating a configuration example of a tag system using this exemplary embodiment. The electronic tag control apparatus 100 (an example of the first terminal) generally includes a display apparatus of a large screen, and is operated by a facilitator. The display apparatus can be viewed by all participants. Each electronic tag terminal 250 (an example of the second terminal) is operated by a participant at an assembly, and each participant generally owns one electronic tag terminal. For example, a tablet type terminal and the like can be used as the electronic tag terminal 250.

In the example of FIG. 2, an electronic tag control apparatus 100A, an electronic tag terminal 250A, an electronic tag terminal 250B, and an electronic tag terminal 250C are installed at a conference room 280A, and an assembly is performed in the conference room. The electronic tag control apparatus 100A, the electronic tag terminal 250A, the electronic tag terminal 250B, and the electronic tag terminal 250C are connected to each other through a communication line 298. The communication line 298 may be a wireless line, a wired line, or a combination thereof, and may be, for example, the Internet, an intranet, or the like as communication infrastructure.

In addition, an electronic tag control apparatus 100B, an electronic tag terminal 250D, and an electronic tag terminal 250E are installed at a conference room 280B, and an assembly is performed in the conference room. The electronic tag control apparatus 100B, the electronic tag terminal 250D, and the electronic tag terminal 250E are connected to each other through the communication line 298.

A mount-tag-and-the-like information storage device 294, a device in the conference room 280A, and a device in the conference room 280B are connected to each other through a communication line 299. In addition, a function of the mount-tag-and-the-like information storage device 294 may be realized as a cloud service.

The mount-tag-and-the-like information storage device 294 stores information on a tag. Each electronic tag control apparatus 100 performs processing by using the mount-tag-and-the-like information storage device 294. In this case, the information on the tag in the mount-tag-and-the-like information storage device 294 may be shared by plural electronic tag control apparatuses 100. That is, information (information stored in the mount information storage module 135 and the tag information storage module 140) on a mount and a tag which are managed by the electronic tag control apparatus 100A may be used by the electronic tag control apparatus 100B. Particularly, in a case where plural assemblies (for example, assemblies in the conference room 280A and the conference room 280B) are involved in one project, a tag corresponding to the same task may be attached to a mount at another assembly. Thereby, at one assembly, it is possible to ascertain conditions of the same task at another assembly.

In addition, for example, a facilitator appropriately controls an access right with respect to materials which are added, changed, or the like during an assembly on an ad hoc basis, and thus it is possible to control the reference of information from the electronic tag terminal 250 in accordance with the facilitator's intention.

Figure 3A:
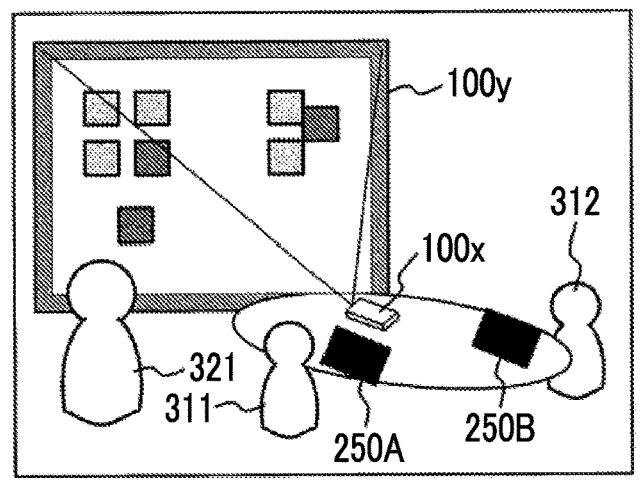
FIGS. 3A to 3C are diagrams illustrating an example of the use of an electronic tag terminal and an electronic tag control apparatus at a conference room or the like in which this exemplary embodiment is used.
Figure 3B:
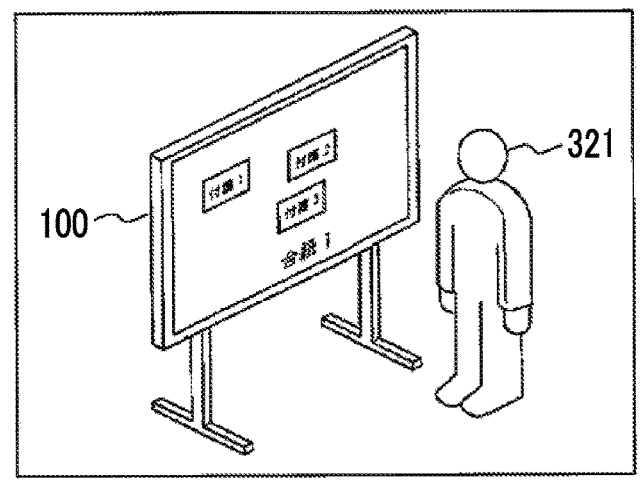
Figure 3C:
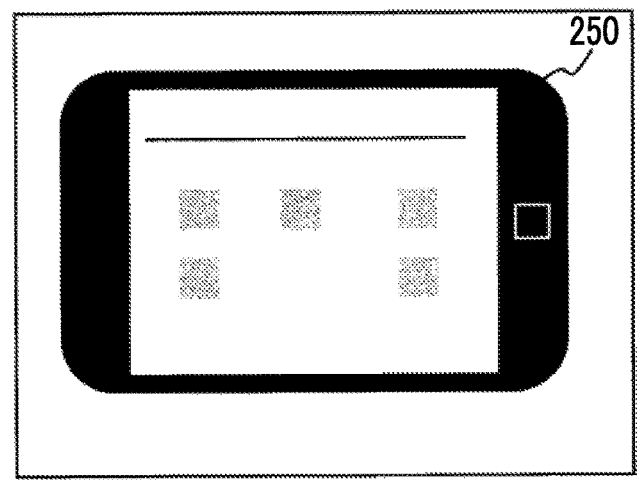

FIGS. 3A to 3C are diagrams illustrating examples of the use of the electronic tag terminal 250 and the electronic tag control apparatus 100 at a conference room or the like in which this exemplary embodiment is used.

As illustrated in the example of FIG. 3A, participants 311 and 312 and a facilitator 321 are gathered in a conference room or the like. The participant 311 uses the electronic tag terminal 250A, and the participant 312 uses the electronic tag terminal 250B. In general, one terminal apparatus (electronic tag terminal 250A or the like) is given to each participant. The terminal apparatus is a tablet type terminal which is as large as a notebook (for example, A4, B5, 7 inches to 10 inches, or the like) like the electronic tag terminal 250 illustrated in the example of FIG. 3C, and is operated using a finger, a pen, or the like. Tag information including text data, a handwritten character, a figure, or the like is created by the participant. Meanwhile, the terminal apparatus is not limited to the tablet-type terminal, and may be a PC (a notebook PC is included) which includes a keyboard, a mouse, and the like.

An electronic tag control apparatus 100x illustrated in the example of FIG. 3A is a projector, and displays a mount and a tag. In addition, an electronic tag control apparatus 100y, which is an electronic white board, detects the motion of a finger of the facilitator 321, a pen, or the like and receives operations such as the attachment of a child mount or a tag to a mount (table), the movement of the child mount or the tag, and the association (grouping) of the child mount or the tag. For example, the electronic tag control apparatus 100y includes a pen, and receives operations with respect to the mount, the child mount, and the tag by the separation of the pen from a predetermined pen holder (the lift-up of the pen in order for the facilitator 321 to perform an operation) and by detecting the position of the tip end of the pen (the touch of the tip end of the pen on the electronic tag control apparatus 100y, or the like). For example, the pen holder is provided with a sensor (a sensor which is switched on or off by the gravity of the pen, or the like), and it may be detected which pen among plural pens (a black pen, a red pen, a blue pen, and the like) is used. In addition, the entire display screen of the electronic tag control apparatus 100y is a touch sensor, and a touch position of the display screen and pressure may be detected. In this example, the turn-on and turn-off of the pen are controlled by the pen holder, but the pen holder is not necessarily required to be provided. The turn-on and turn-off of the pen may be directly controlled on the pen side. Regarding the change of color, the color may be changed by preparing a color palette at a portion on the display screen and touching a target color by a pen (or something similar to a pen) without requiring a pen holder, or a pen may be equipped with a function (a button, a slider, or the like) for giving an instruction for changing color.

In addition, the electronic tag control apparatus 100 may be an electronic board as illustrated in the example of FIG. 3B. The electronic board generally includes a large-screen display apparatus (larger than at least the display apparatus of the electronic tag terminal 250), and the display apparatus is a touch panel and detects a touched position of the display screen and pressure. For example, the screen may be a screen having a size of 80 inches, or the like.

Figure 4:
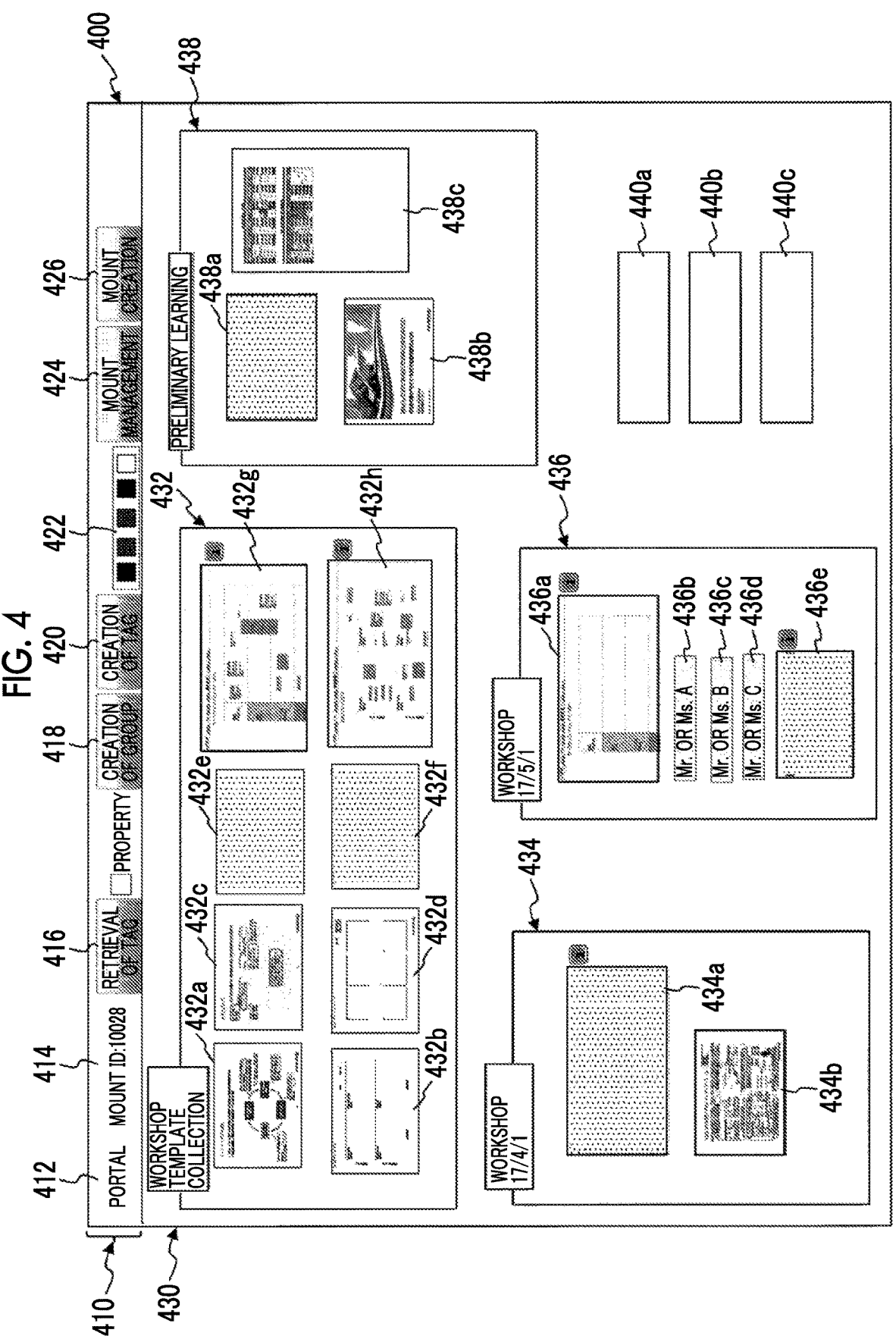
FIG. 4 is a diagram illustrating a processing example according to this exemplary embodiment.

FIG. 4 is a diagram illustrating a processing example according to this exemplary embodiment.

A tool bar region 410 and a mount display region 430 are displayed on a shared screen 400.

A mount name column 412, a mount ID column 414, a tag retrieval tab 416, a group creation tab 418, a tag creation tab 420, a pen color designation region 422, a mount management tab 424, and a mount creation tab 426 are displayed in the tool bar region 410. For example, a name "portal" of a mount is displayed in the mount name column 412, and a mount ID of the mount is displayed in the mount ID column 414. Meanwhile, a PIN-CODE is presented in the tool bar region 410 before the mount is displayed. A participant inputs the PIN-CODE into a second terminal of the participant, puts a link between the second terminal and the mount, and performs the same display as the tool bar region 410 on the second terminal.

A workshop template child mount 432, a workshop 17/4/1 child mount 434, a workshop 17/5/1 child mount 436, a preliminary learning child mount 438, a tag 440a, a tag

440*b*, and a tag 440*c* are displayed in the mount display region 430. In addition to the tag, a document or a mount which is formed as a tag (a content, a child mount) is displayed in the mount display region 430. In this manner, it is possible to arrange, prepare, and the like a template and results on the shared screen 400. That is, it is possible to perform treatment such as in a portal screen at a so-called workshop.

A mode such as a child mount (the workshop template child mount 432, a child mount 432*a*, or the like) in a mount (the mount display region 430) is provided, and thus it is possible to perform the movement and copying of the child mount itself in the mount, the movement and copying of the child mount to another mount, and the movement of contents (a tag, an additional child mount) and copying of the child mount to the mount or another mount. A hierarchical structure is formed between the mount and the child mount. Naturally, the child mount may be further provided with a child mount.

The workshop template child mount 432 further includes a child mount 432*a*, a child mount 432*b*, a child mount 432*c*, a child mount 432*d*, a child mount 432*e*, a child mount 432*f*, a child mount 432*g*, and a child mount 432*h*, and these mounts are displayed.

The workshop 17/4/1 child mount 434 further includes a child mount 434*a* and a child mount 434*b*, and these mounts are displayed.

The workshop 17/5/1 child mount 436 further includes a child mount 436*a*, a tag 436*b*, a tag 436*c*, a tag 436*d*, and a child mount 436*e*, and these mounts and tags are displayed.

The preliminary learning child mount 438 further includes a child mount 438*a*, a child mount 438*b*, and a child mount 438*c*, and these mounts are displayed.

Figure 5:
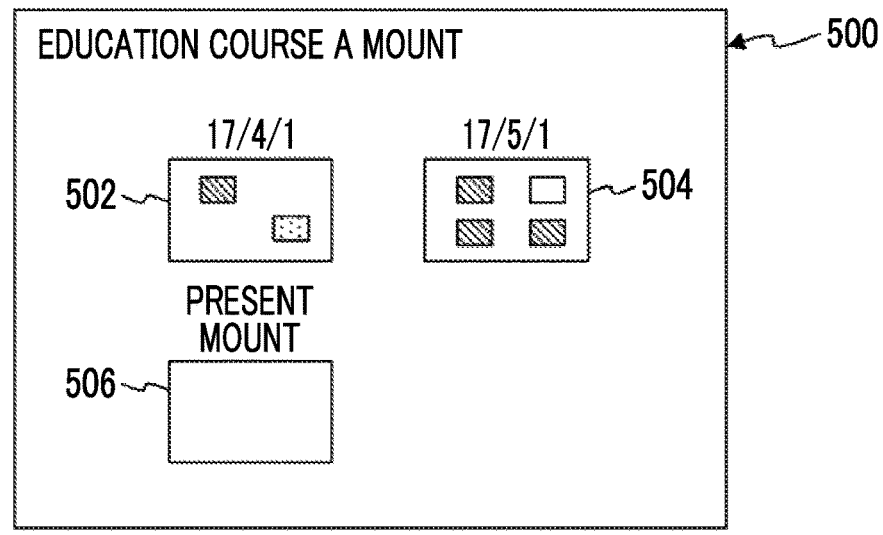
FIG. 5 is a diagram illustrating a processing example according to this exemplary embodiment.

FIG. 5 is a diagram illustrating a processing example according to this exemplary embodiment.

An education course A mount 500 includes a child mount 502, a child mount 504, and a child mount 506, and these mounts are displayed. For example, the education course A mount 500 includes various pieces of information, but a portion (for example, the child mount 506) of the information is shared with the present participant. For example, histories (the child mount 502, the child mount 504) of a workshop are collected on the education course A mount 500 as a base portal to prepare a mount (child mount 506) for the present workshop.

Figure 6:
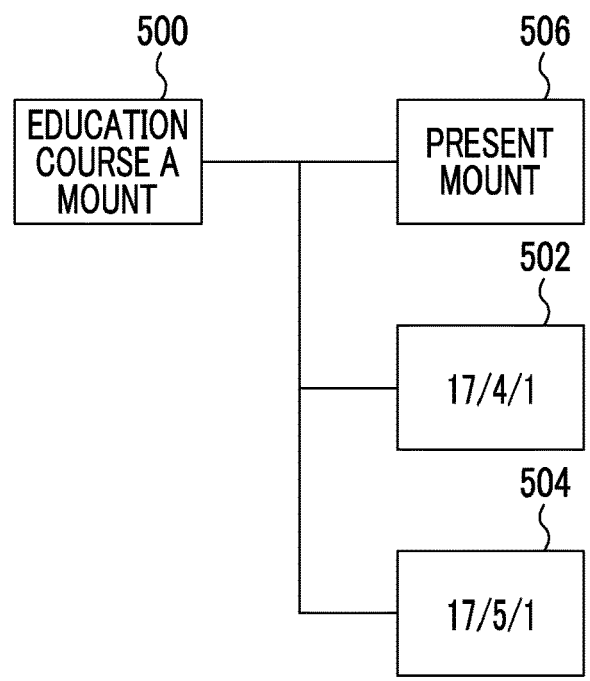
FIG. 6 is a diagram illustrating an example of a data group to be processed according to this exemplary embodiment.

FIG. 6 is a diagram illustrating an example of a data group to be processed according to this exemplary embodiment.

A relationship between the education course A mount 500, the child mount 502, the child mount 504, and the child mount 506 which are illustrated in the example of FIG. 5 has a tree structure as illustrated in the example of FIG. 6.

That is, the child mount 502, the child mount 504, and the child mount 506 are positioned below the education course A mount 500 (as a child in the tree structure) (on the contrary, the education course A mount 500 is positioned above the child mount 502, the child mount 504, and the child mount 506 (as a parent in the tree structure)).

The child mount 506 which is the present target is opened from the education course A mount 500 as illustrated in the example of FIG. 5 on the shared screen, in accordance with a facilitator's operation. The electronic tag terminal 250 of each participant is associated with the child mount 506 by a PINCODE.

FIGS. 7A1 to 7B2 are diagrams illustrating a processing example according to this exemplary embodiment.

In the example of FIG. 7A1, a mount 506*a* is displayed on a shared screen 700.

The mount 506*a* includes a child mount 512*a* (a mount for performing evaluation from a point of view of marketing of customer solution, customer cost, convenience, and communication (4C)), a child mount 514*a* (a mount for performing factor analysis in accordance with four categories of Strengths, Weaknesses, Opportunities, and Threats (SWOT)), and a child mount 516*a* (a mount for evaluating a marketing method from a point of view of Product, Price, Promotion, and Place (4P)), and these mounts are displayed.

In the example of FIG. 7B1, a mount 506*b* is displayed on a user terminal screen 750 in the electronic tag terminal 250 associated with the mount 506*a*.

The mount 506*b* includes a child mount 512*b*, a child mount 514*b*, and a child mount 516*b*, and these mounts are displayed. That is, the same contents as those of the mount 506*a* illustrated in the example of FIG. 7A1 are displayed. However, in the shared screen 700, the child mount 512*a*, the child mount 514*a*, and the child mount 516*a* display a thumbnail image of each child mount. However, the electronic tag terminal 250 does not yet have an access right, and thus the child mount 512*b*, the child mount 514*b*, and the child mount 516*b* performs a display which is not a thumbnail image (specifically, "?" is displayed in the child mount 512*b* and the like), on the user terminal screen 750. However, an access right has not yet been given, and thus the child mount 512*b*, the child mount 514*b*, and the child mount 516*b* may also be displayed as thumbnail images on the user terminal screen 750. Naturally, in this state, an access right has not been given even in a case where an operation of opening the child mount 512*b*, the child mount 514*b*, and the child mount 516*b* is performed on the user terminal screen 750, and thus the mounts cannot be opened.

The mount 506*a* shows the entire image of a workshop, but a mount within the mount 506*b* cannot be referred to on the user terminal screen 750 until an opening operation is performed on the shared screen 700. In a case where the mount is opened on the shared screen 700, access to the same mount can be performed on the user terminal screen 750 (so-called synchronization can be performed).

Specifically, in the example of FIG. 7A2, it is assumed that the child mount 514*a* is opened by a facilitator's operation. Therefore, a mount 514*c* (contents of the child mount 514*a*) is displayed on the shared screen 700.

Thereafter, as illustrated in the example of FIG. 7B2, a mount 514*d* (contents of the child mount 514*b*, the same contents as those of the mount 514*c*) is displayed on the user terminal screen 750 in a case where it is assumed that the child mount 514*b* is also opened by a user's operation on the user terminal screen 750. That is, since the child mount 514*a* has already been opened on the shared screen 700, the electronic tag terminal 250 can access the child mount 514*b*, and thus the child mount 514*b* can also be opened on the user terminal screen 750. In this state, the mount 514*d* is also displayed on the user terminal screen 750 in synchronization with the display of the mount 514*c* on the shared screen 700.

FIGS. 8A1 to 8B2 are diagrams illustrating a processing example according to this exemplary embodiment.

In a case where the mount 514*c* is closed on the shared screen 700 from the state in the example of FIG. 7A2, the processing returns to the mount 506*a* (the entire image of the workshop) as illustrated in the example of FIG. 8A1.

Thereafter (after access to the child mount 514*a* can be performed on the shared screen 700), a child mount 514*e* which is a thumbnail image is displayed on the user terminal screen 750 as illustrated in the example of FIG. 8B1, it is possible to display the mount 514*d* on the user terminal screen 750 by opening the child mount 514*e*, as illustrated in the example of FIG. 8B2.

Figure 15:
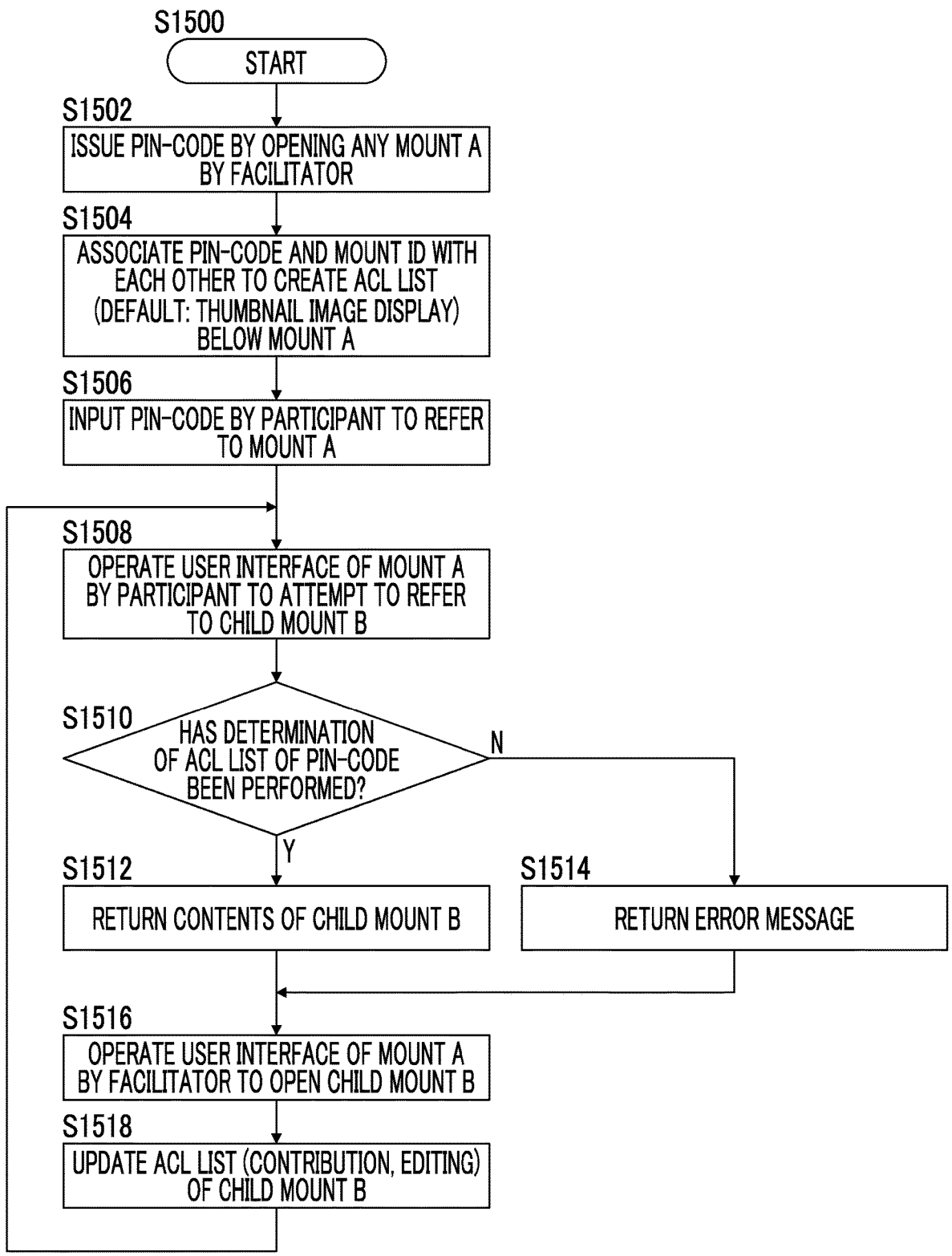
FIG. 15 is a flowchart illustrating a processing example according to this exemplary embodiment.

FIG. 15 is a flowchart illustrating a processing example according to this exemplary embodiment. For example, the entire image (outline) of a workshop has been described using the mount 506*a* as illustrated in the example of FIG. 7A1, but a facilitator is used in a case where the reference and editing of detailed contents of child mounts (the child mount 514*a* and the like) are desired to be controlled.

In step S1502, a PIN-CODE is issued by opening any mount A in accordance with the facilitator's operation.

In step S1504, the PIN-CODE and a mount ID are associated with each other to create an ACL list below the mount A. For example, the thumbnail image display (thumbnail image display column 1420) of a default may be performed as contents of the ACL list (the access right table 1400).

In step S1506, a participant inputs the PIN-CODE to refer to the mount A.

In step S1508, the participant operates a user interface of the mount A to attempt to refer to a child mount B.

In step S1510, the determination of the ACL list of the PIN-CODE is performed. In a case where "an access right has been given" (step S1510: Y), the processing proceeds to step S1512. Otherwise, the processing proceeds to step S1514.

In step S1512, contents of the child mount B are returned.

In step S1514, an error message is returned.

In step S1516, the facilitator operates the user interface of the mount A to open the child mount B.

In step S1518, the ACL list (contribution, editing) of the child mount B is updated, and the processing returns to step S1508.

Figure 16:
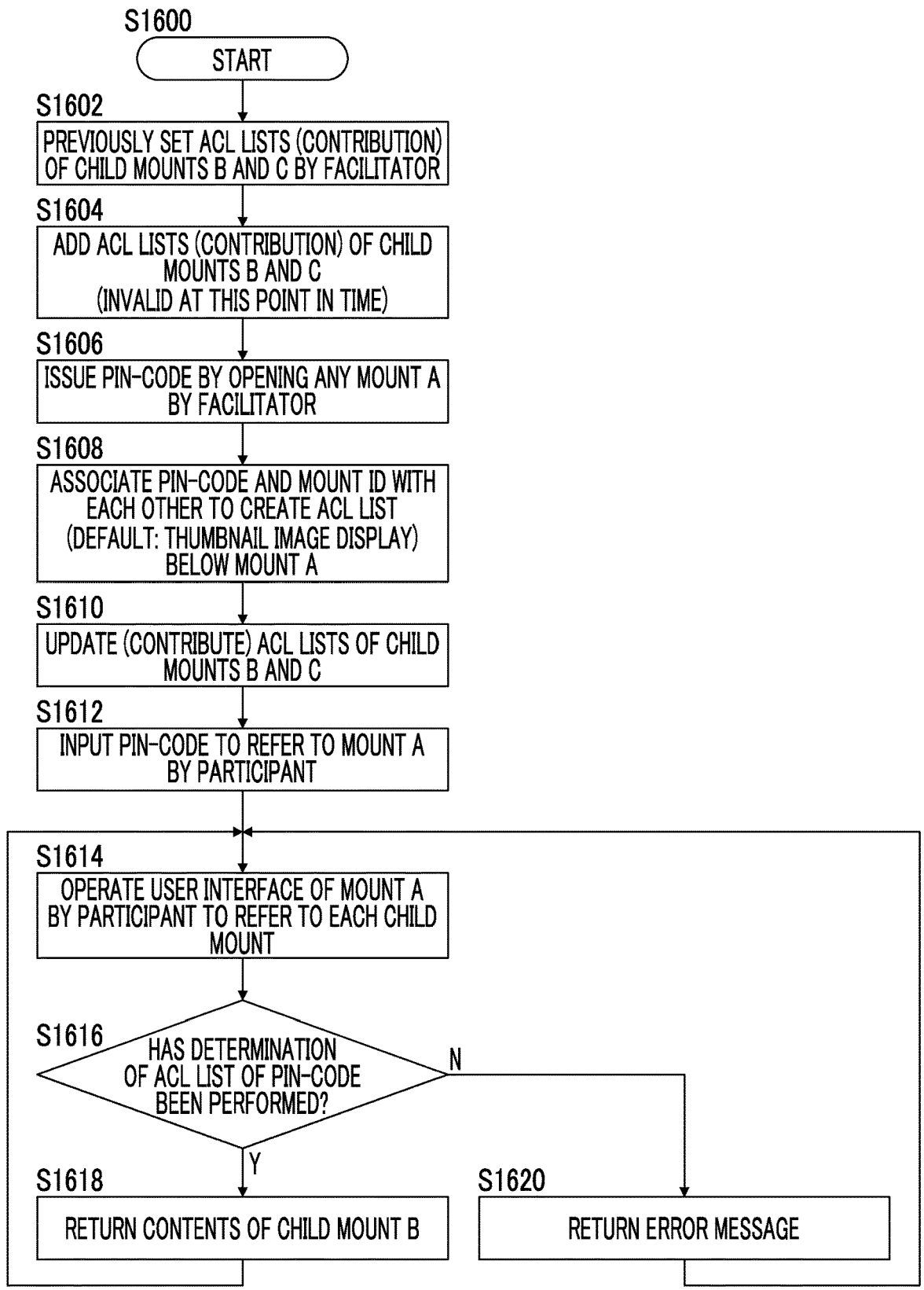
FIG. 16 is a flowchart illustrating a processing example according to this exemplary embodiment.

FIG. 16 is a flowchart illustrating a processing example according to this exemplary embodiment. For example, a facilitator desires to entrust a workshop to a participant to a certain extent. For example, the facilitator is appropriately used in a case where the reference of contents of a child mount is desired to be permitted.

In step S1602, the facilitator previously sets ACL lists (contribution) of child mounts B and C.

In step S1604, the ACL lists (contribution) of child mounts B and C are added (invalid at this point in time).

In step S1606, the facilitator issues a PIN-CODE by opening any mount A.

In step S1608, the PIN-CODE and a mount ID are associated with each other to create an ACL list (default: thumbnail image display) below the mount A.

In step S1610, the ACL lists of the child mounts B and C are updated (contributed).

In step S1612, the participant inputs the PIN-CODE to refer to the mount A.

In step S1614, the participant operates a user interface of the mount A to refer to each child mount.

In step S1616, the determination of the ACL list of the PIN-CODE is performed. In a case where "an access right has been given" (step S1616: Y), the processing proceeds to step S1618. Otherwise, the processing proceeds to step S1620.

In step S1618, contents of the child mount B are returned, and the processing returns to step S1614.

In step S1620, an error message is returned, and the processing returns to step S1614.

Figure 17:
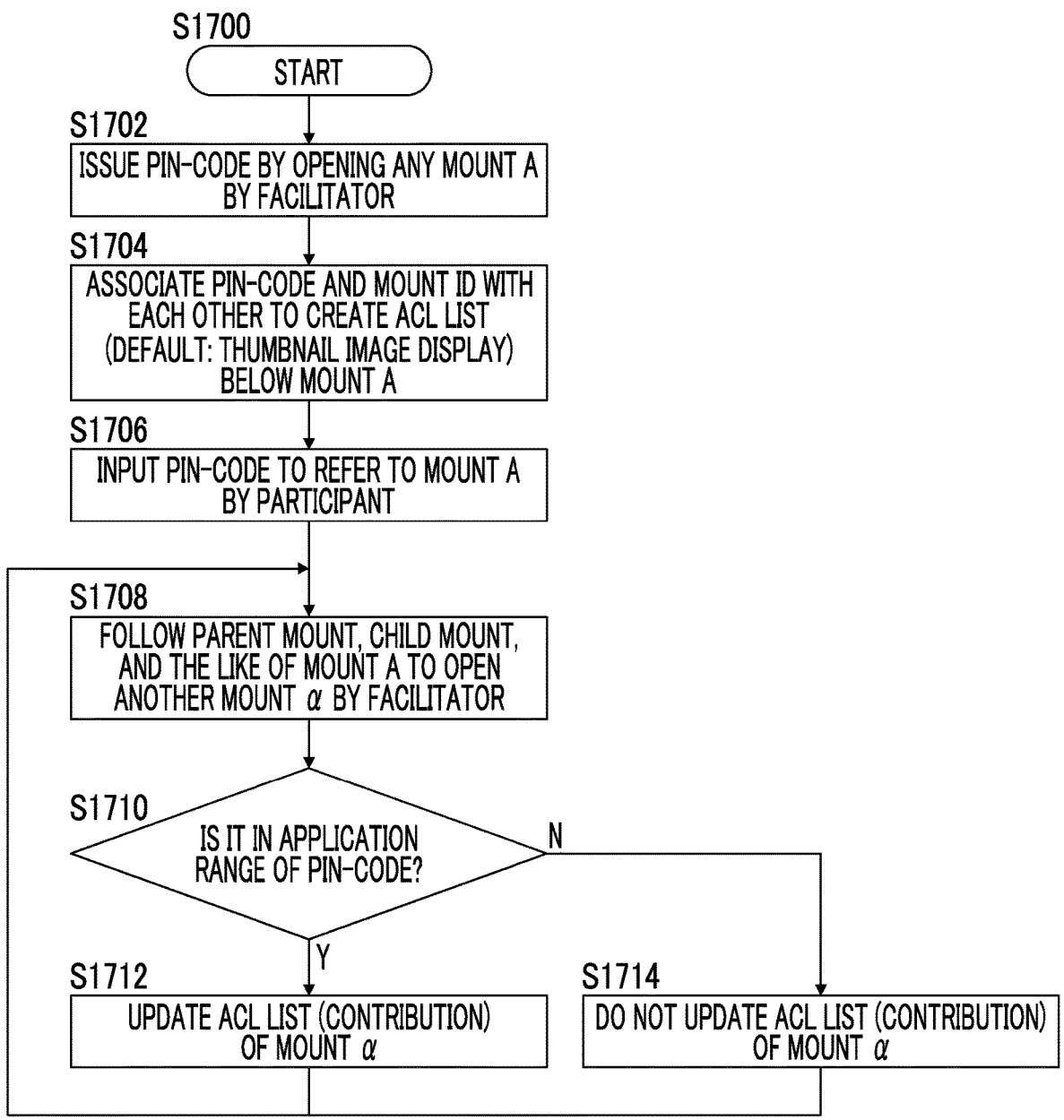
FIG. 17 is a flowchart illustrating a processing example according to this exemplary embodiment.

FIG. 17 is a flowchart illustrating a processing example according to this exemplary embodiment. For example, a facilitator is used in a case where another mount and materials are desired to be extremely temporarily showed to the present participant, but individual reference and editing are not desired to be performed.

In step S1702, the facilitator issues a PIN-CODE by opening any mount A.

In step S1704, the PIN-CODE and a mount ID are associated with each other to create an ACL list (default: thumbnail image display) below the mount A.

In step S1706, the participant inputs the PIN-CODE to refer to the mount A.

In step S1708, the facilitator follows a parent mount, a child mount, and the like of the mount A to open another mount α.

In step S1710, the determination of whether being in an application range of the PIN-CODE is performed. In a case of being in the application range, the processing proceeds to step S1712. Otherwise, the processing proceeds to step S1714.

In step S1712, an ACL list (contribution) of the mount α is updated, and the processing returns to step S1708.

In step S1714, the ACL list (contribution) of the mount α is not updated, and the processing returns to step S1708.

Figure 18:
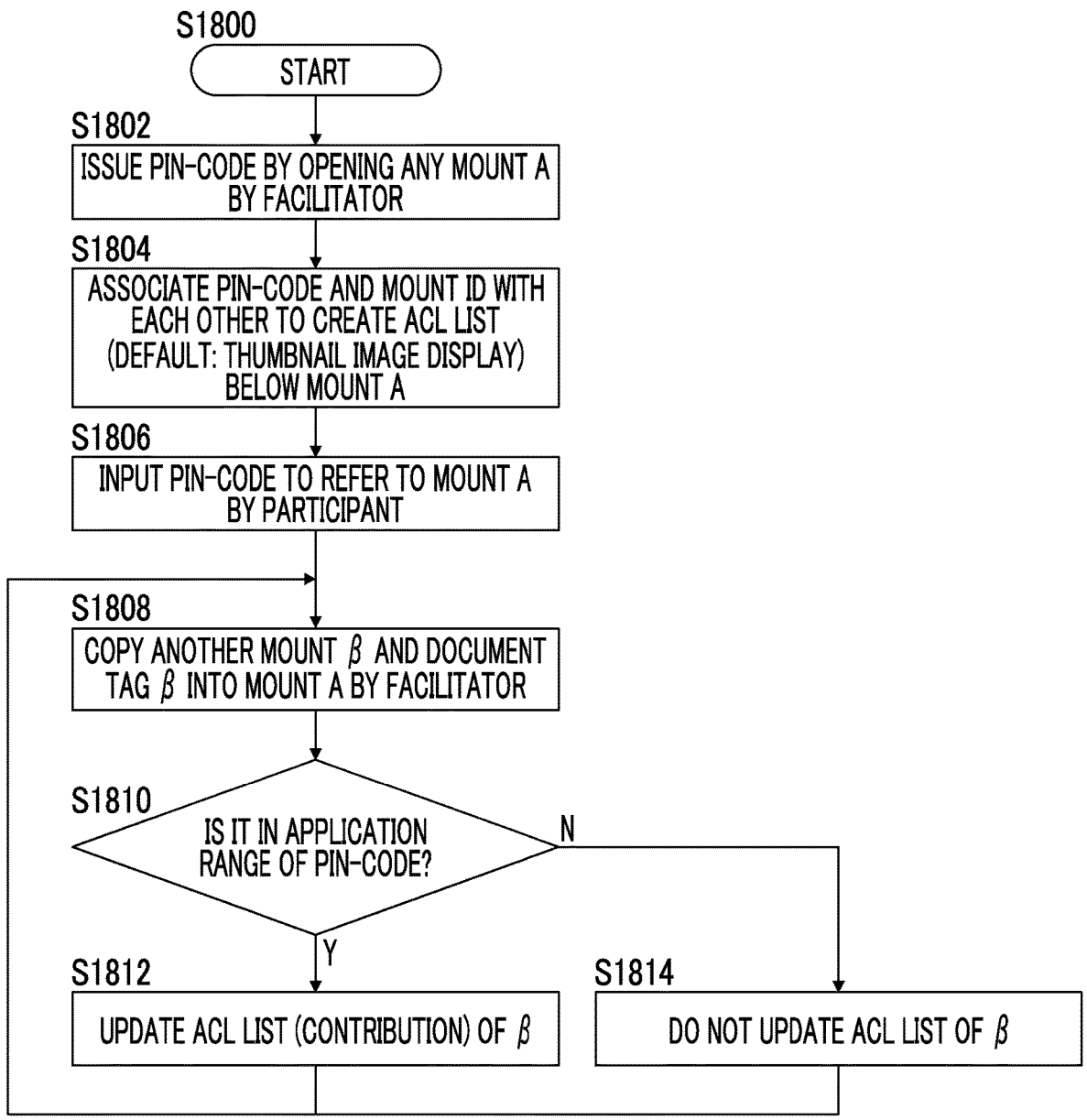
FIG. 18 is a flowchart illustrating a processing example according to this exemplary embodiment.

FIG. 18 is a flowchart illustrating a processing example according to this exemplary embodiment. For example, a facilitator is used in a case where another mount and materials, which are thought of during a workshop, are desired to be shared with the present participant.

In step S1802, the facilitator opens any mount A to issue a PIN-CODE.

In step S1804, the PIN-CODE and a mount ID are associated with each other to create an ACL list (default: thumbnail image display) below the mount A.

In step S1806, the participant inputs the PIN-CODE to refer to the mount A.

In step S1808, the facilitator copies another mount β and a document tag β into the mount A.

In step S1810, the determination of whether being an application range of the PIN-CODE is performed. In a case of being the application range, the processing proceeds to step S1812. Otherwise, the processing proceeds to step S1814.

In step S1812, an ACL list (contribution) of β is updated, and the processing returns to step S1808.

In step S1814, the ACL list of β is not updated, and the processing returns to step S1808.

Figure 19:
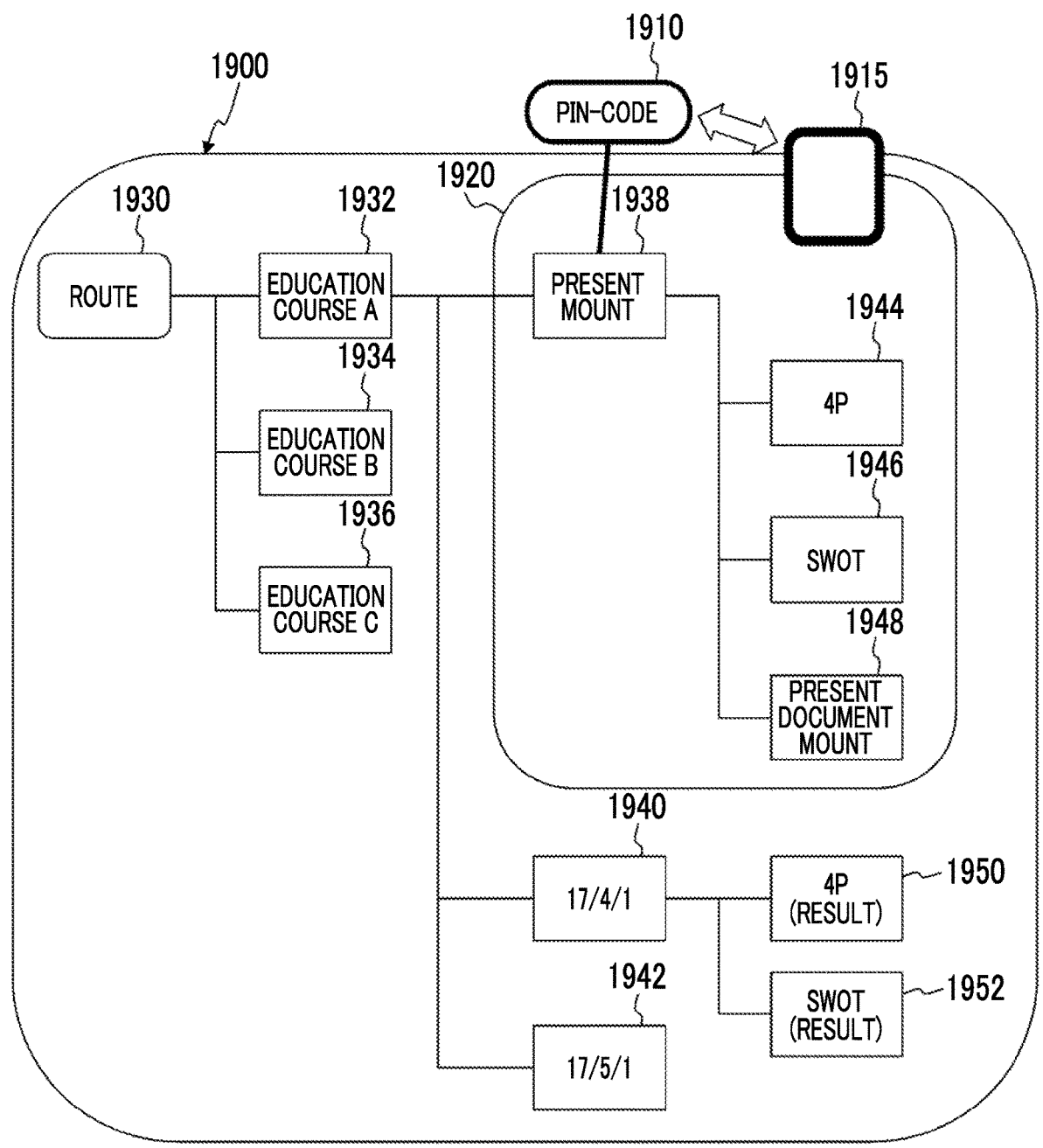
FIG. 19 is a diagram illustrating an example of a data group to be processed according to this exemplary embodiment.

FIG. 19 is a diagram illustrating an example of a data group to be processed according to this exemplary embodiment.

A mount group 1900 capable of being referred to by a facilitator includes a mount group having a tree structure below the mount group 1900 capable of being referred to by the facilitator. Specifically, an education course A mount 1932, an education course B mount 1934, and an education course C mount 1936 are positioned at the lower layer of the route 1930. A present mount 1938, a 17/4/1 mount 1940, and a 17/5/1 mount 1942 are positioned at the lower layer of the education course A mount 1932. A 4P mount 1944, an SWOT mount 1946, and a present document mount 1948 are positioned at the lower layer of the present mount 1938. A 4P (result) mount 1950 and an SWOT (result) mount 1952 are positioned at the lower layer of the 17/4/1 mount 1940.

The facilitator attempts to perform an assembly by using the present mount 1938 (including the 4P mount 1944, the SWOT mount 1946, and the present document mount 1948). For this reason, a PIN-CODE 1910 corresponding to the present mount 1938 is issued. That is, a temporary PIN-CODE 1910 is issued for an object (present mount 1938)

having a hierarchical structure. A participant at the assembly inputs the PIN-CODE 1910 into a user terminal 1915 to obtain a mount group 1920 capable of being referred to by the participant. The mount group 1920 capable of being referred to by the participant includes the present mount 1938, the 4P mount 1944, the SWOT mount 1946, and the present document mount 1948.

Regarding an object group (the present mount 1938, the 4P mount 1944, the SWOT mount 1946, the present document mount 1948, and tags attached thereto) which corresponds to the PIN-CODE 1910, the facilitator can change an access right by hand or through the electronic tag control apparatus 100. For example, an access right setting screen 2000 illustrated in FIG. 20 is displayed, and an access right is set by an operation performed on the access right setting screen 2000.

Figure 20:
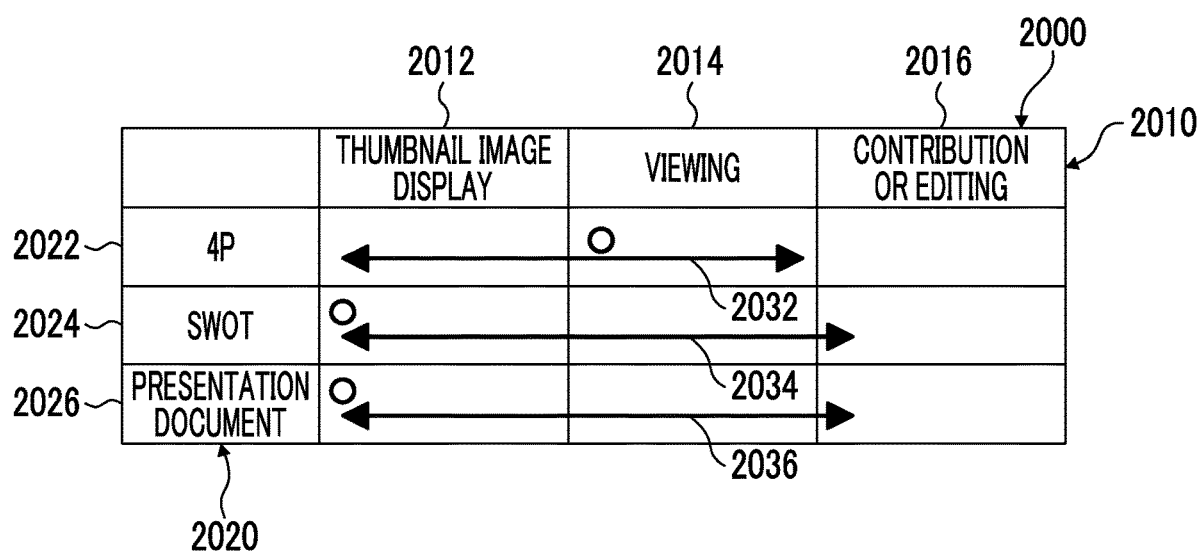
FIG. 20 is a diagram illustrating a processing example according to this exemplary embodiment.

FIG. 20 is a diagram illustrating a processing example according to this exemplary embodiment. Meanwhile, in the example of FIG. 20, three access rights of thumbnail image display, viewing, and contribution or editing can be set. However, among the three access rights, any one or more access rights may be displayed so as to be set.

An access right column 2010 and a mount column 2020 are displayed on the access right setting screen 2000. The access right column 2010 includes a thumbnail image display column 2012, a viewing column 2014, a contribution or editing column 2016. The mount column 2020 includes a 4P mount 2022, an SWOT mount 2024, and a present document mount 2026.

An arrow 2032, an arrow 2034, and an arrow 2036 in the access right column 2010 indicate a changeable range of an access right. For example, it is indicated that access rights of the thumbnail image display column 2012 and the viewing column 2014 can be set by the arrow 2032 with respect to the 4P mount 2022, but an access right of the contribution or editing column 2016 cannot be set. In addition, it is indicated that only the viewing column 2014 is set by the facilitator, as indicated by a mark ○ with respect to the 4P mount 2022.

Figure 21:
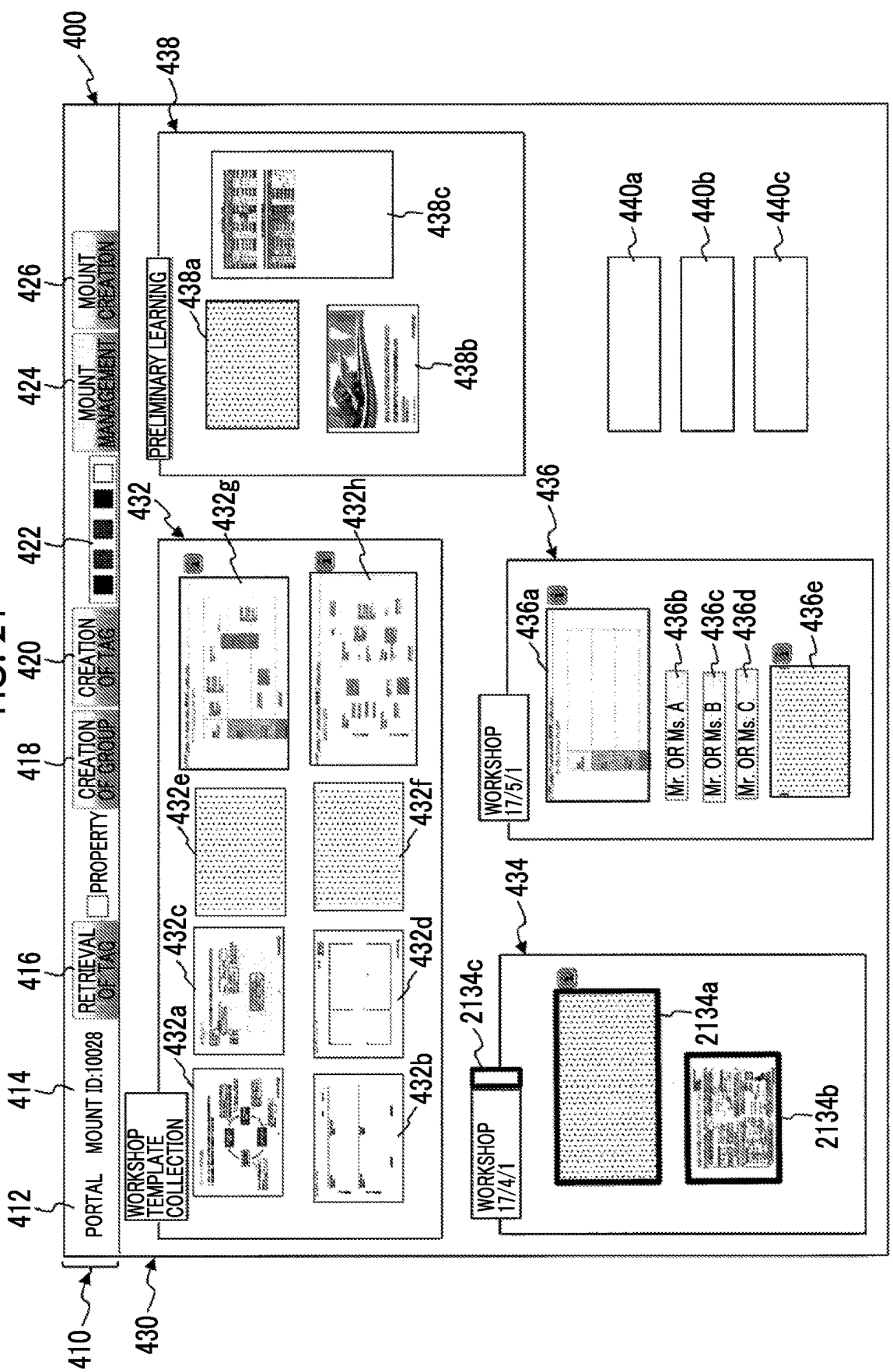
FIG. 21 is a diagram illustrating a processing example according to this exemplary embodiment.

FIG. 21 is a diagram illustrating a processing example according to this exemplary embodiment.

In the display of a child mount on the shared screen 400, a display mode may be changed in accordance with an access right.

For example, a color frame based on an access right may be applied to a thumbnail tag. For example, a blue frame (for example, a child mount 2134*a*) is applied to a thumbnail image of a child mount for which a viewing right is set, a red frame (for example, a child mount 2134*b*) is applied to a child mount for which a contribution or editing right is set, and the display of only a thumbnail image without a frame (or the display of only a black frame line without a thumbnail image) may be applied to a child mount for which an access right is not given (for example, a child mount 432*a* or the like).

In addition, a PIN-CODE issuance check column 2134*c* may be displayed for a mount (the workshop 17/4/1 child mount 434) for which a PIN-CODE has been issued.

Figure 22:
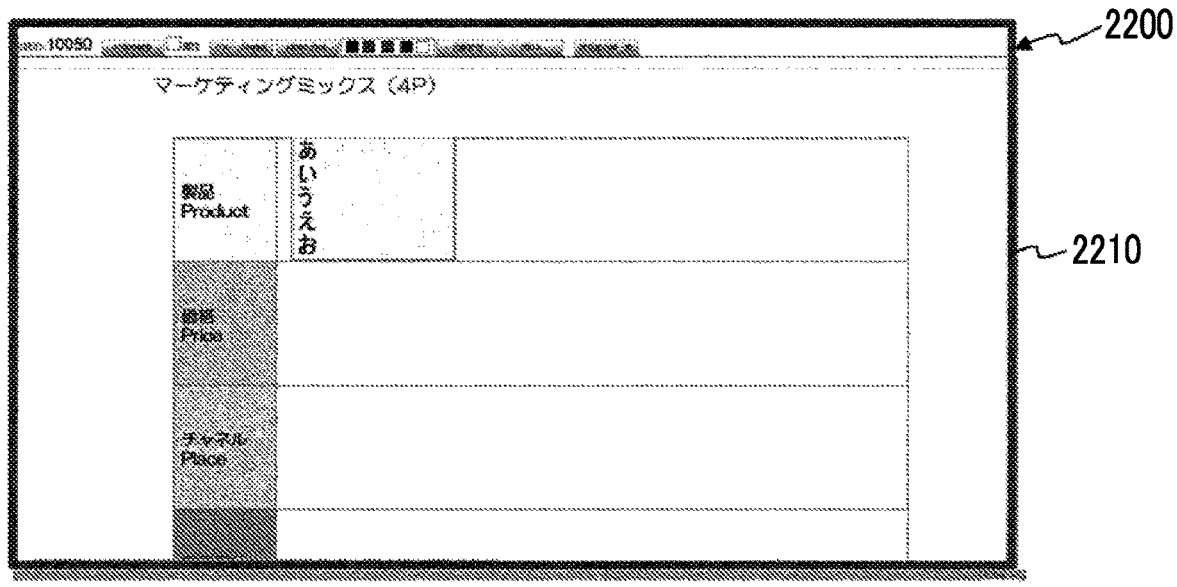
FIG. 22 is a diagram illustrating a processing example according to this exemplary embodiment.

FIG. 22 is a diagram illustrating a processing example according to this exemplary embodiment.

In a case where the child mount 2134*a* is opened from the state illustrated in the example of FIG. 21 on the shared screen 400, a mount 2200 illustrated in the example of FIG. 22 is displayed. In this case, a red frame 2210 may be drawn in the vicinity of the mount 2200.

A facilitator can correct an access right on the spot. For example, the access right setting screen 2000 illustrated in FIG. 20 may be displayed and corrected. In a case where resetting is manually performed once, the setting becomes valid.

Figure 23:
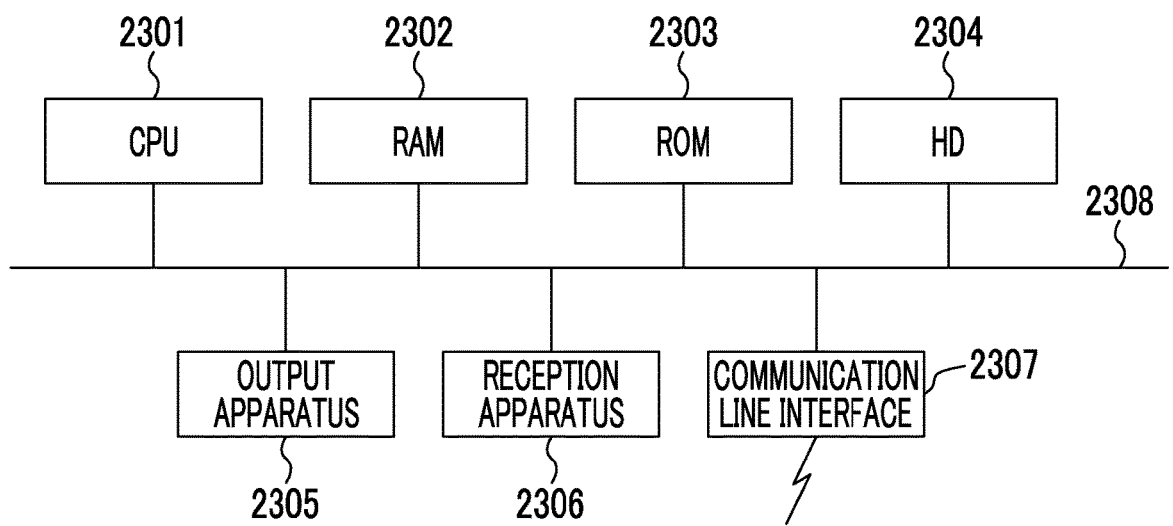
FIG. 23 is a block diagram illustrating a hardware configuration example of a computer for realizing this exemplary embodiment.

Meanwhile, a hardware configuration of a computer executing a program as this exemplary embodiment is a general computer as illustrated in FIG. 23, and specifically, is a personal computer, a computer that may serve as a server, or the like. That is, as a specific example, a CPU 2301 is used as a processing unit (computational unit), and a RAM 2302, a ROM 2303, and an HD 2304 are used as storage apparatuses. As the HD 2304, for example, a hard disk or a Solid State Drive (SSD) may be used. The computer includes the CPU 2301 that executes programs such as the control processing module 105, the access control processing module 110, the code issuance module 115, the access control module 120, the operation processing module 125, the control module 130, the shared screen presentation module 145, and the communication module 150, the RAM 2302 that stores the programs and data, the ROM 2303 hat stores programs for starting up the computer, and the like, the HD 2304 which is an auxiliary storage device (may be a flash memory or the like) which has functions as the mount information storage module 135 and the tag information storage module 140, a reception apparatus 2306 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 2305 such as a CRT, a liquid crystal display, or a speaker, a communication line interface 2307, such as a network interface card, for connection to a communication network, and a bus 2308 for transmitting and receiving data by connecting the above-mentioned components to each other. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 23 shows one configuration example. This exemplary embodiment is not limited to the configuration illustrated in FIG. 23, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 23 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more functions of a scanner, a printer, a copying machine, and a facsimile), and the like, in addition to a personal computer.

In the above-described exemplary embodiment, a description has been given of an example of a case where a mount is used as an icon and a child mount is used as a content, but other examples may be used. That is, as an example of an icon, the icon may be replaced with a folder, a mark indicating an application, or the like instead of the mount. As an example of the content, in a case where the icon is a folder, the icon may be replaced with a child folder capable being included in the folder, a document, file, or the like instead of the child mount. In a case where the icon is a mark indicating an application, the icon may be replaced with an application (software itself) which corresponds to the mark of the application, instead of the child mount.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an access controller that performs control for enabling a content to be accessed on a second terminal by a second user in a case where an icon storing the content is presented and the content is opened by a first user other than the second user in a first terminal other than the second terminal, wherein the content is attached onto the icon, wherein the first terminal comprises a shared screen;
an issuance unit that issues a code for accessing the icon;
a presentation unit that presents the code to the second user by displaying the code on the shared screen, wherein the second user is able to input the code to the second terminal after the second user views the code displayed on the shared screen; and
a second presentation unit that controls the second terminal to present the icon, on a condition that the code is received by the first terminal from the second terminal operated by the second user,
wherein when the icon storing the content is presented and the content is closed by the first user in the first terminal after the content has been opened by the first user in the first terminal, the content still can be accessed on the second terminal by the second user by opening the icon storing the content in the second terminal,
wherein the second user is authorized to edit the content of the icon via the second terminal.

2. The information processing apparatus according to claim 1,
wherein the access controller performs control so as not to allow access to the content on the second terminal in a case where the icon is presented on the first terminal but the content is not opened.

3. The information processing apparatus according to claim 2,
wherein a reduced image of the content is presented on the second terminal even in a state where access to the content is not allowed on the second terminal.

4. The information processing apparatus according to claim 1, further comprising:
a setting unit that sets an access right with respect to the content in accordance with an operation of a user of the first terminal.

5. The information processing apparatus according to claim 4,
wherein the setting of the access right by the setting unit is validated after the content is opened.

6. The information processing apparatus according to claim 4,
wherein the setting of the access right by the setting unit is capable of being performed even before the icon is presented.

7. The information processing apparatus according to claim 4,
wherein any one or more access rights of thumbnail image display, viewing, and contribution or editing are capable of being set as the access right.

8. The information processing apparatus according to claim 1,
wherein the code is a code for temporarily accessing the icon.

9. The information processing apparatus according to claim 8,
wherein in a case where the code is invalidated in the first terminal, an access right with respect to the icon and the content for the second terminal is invalidated.

10. The information processing apparatus according to claim 1,
wherein in a case where a content included in an icon different from the icon for which the code is issued is opened in the first terminal, control is performed so that a, parent icon is not accessed from the second terminal even in a case where the code is valid with respect to the parent icon.

11. The information processing apparatus according to claim 1,
wherein in a case where another content not included in the icon is copied to the icon in the first terminal, control is performed so that the other content is accessed from the second terminal in a case where the code is valid.

12. A non-transitory computer readable medium storing an information processing program causing a computer to function as:
an access controller that performs control for enabling a content to be accessed on a second terminal by a second user in a case where an icon storing the content is presented and the content is opened by a first user other than the second user in a first terminal other than the second terminal, wherein the content is attached onto the icon, wherein the first terminal comprises a shared screen;
an issuance unit that issues a code for accessing the icon;
a presentation unit that presents the code to the second user by displaying the code on the shared screen, wherein the second user is able to input the code to the second terminal after the second user views the code displayed on the shared screen; and
a second presentation unit that controls the second terminal to present the icon, on a condition that the code is received by the first terminal from the second terminal operated by the second user,
wherein when the icon storing the content is presented and the content is closed by the first user in the first terminal after the content has been opened by the first user in the first terminal, the content still can be accessed on the second terminal by the second user by opening the icon storing the content in the second terminal,
wherein the second user is authorized to edit the content of the icon via the second terminal.

13. An information processing apparatus comprising:
an access control means for performing control for enabling a content to be accessed on a second terminal by a second user in a case where an icon storing the content is presented and the content is opened by a first user other than the second user in a first terminal other than the second terminal, wherein the content is attached onto the icon, wherein the first terminal comprises a shared screen;
an issuance part means for issuing a code for accessing the icon;
a presentation part means for presenting the code to the second user by displaying the code on the shared screen, wherein the second user is able to input the code to the second terminal after the second user views the code displayed on the shared screen; and
a second presentation part means for controlling the second terminal to present the icon, on a condition that the code is received by the first terminal from the second terminal operated by the second user,
wherein when the icon storing the content is presented and the content is closed by the first user in the first terminal after the content has been opened by the first user in the first terminal, the content still can be accessed on the second terminal by the second user by opening the icon storing the content in the second terminal,
wherein the second user is authorized to edit the content of the icon via the second terminal.

14. The information processing apparatus according to claim 1, wherein
the first user is a facilitator facilitating an assembly, and the second user is a participant other than the facilitator joining the assembly,
the first terminal is operated by the facilitator, and the second terminal is operated by the participant.

15. The information processing apparatus according to claim 1,
wherein when the code corresponding to the content is received by the first terminal from the second user, the content is allowed to be accesses by the second user via the second terminal during a period between an opening and a closing of the content in the first terminal by the first user.

16. The information processing apparatus according to claim 1,
wherein the second terminal is a tablet type terminal operated using a finger or a pen.

17. The information processing apparatus according to claim 1,
wherein the edited content performed by the second user via the second terminal comprises text data, a handwritten character, or a figure.

18. The information processing apparatus according to claim 1,
wherein the code is associated with an identification of the icon to create a list table below the icon.

19. The information processing apparatus according to claim 18,
wherein, when the second user performs an instruction to open the content in the second terminal, and a permission has been given to the second terminal by opening the content in the first terminal by the first user, the second presentation unit controls the second terminal to present the content to the second user, and the list table is updated.

* * * * *